(12) United States Patent  (10) Patent No.: US 8,384,872 B2
Jones  (45) Date of Patent: Feb. 26, 2013

(54) BISTABLE NEMATIC LIQUID CRYSTAL DEVICE

(75) Inventor: John C Jones, Malvern (GB)

(73) Assignee: ZBD Displays Limited, Malvern (GB)

( * ) Notice: Subject to any disclaimer, the term of this patent is extended or adjusted under 35 U.S.C. 154(b) by 157 days.

(21) Appl. No.: 12/213,639

(22) Filed: Jun. 23, 2008

(65) Prior Publication Data

US 2009/0002617 A1  Jan. 1, 2009

Related U.S. Application Data

(63) Continuation of application No. 10/148,273, filed as application No. PCT/GB00/04447 on Nov. 23, 2000, now Pat. No. 7,471,362.

(30) Foreign Application Priority Data

Nov. 30, 1999 (GB) .................................. 9928126.3

(51) Int. Cl.
*C09K 19/02* (2006.01)
*G02F 1/1337* (2006.01)

(52) U.S. Cl. .......................... 349/169; 349/123

(58) Field of Classification Search .......... 349/123–130, 349/201–202, 169
See application file for complete search history.

(56) References Cited

U.S. PATENT DOCUMENTS

| | | | |
|---|---|---|---|
| 4,247,174 A | 1/1981 | Walter | |
| 4,878,742 A | 11/1989 | Ohkubo et al. | |
| 5,576,870 A | 11/1996 | Ohmae | |
| 5,773,178 A | 6/1998 | Shiota et al. | |
| 5,796,459 A | 8/1998 | Bryan-Brown et al. | |
| 5,808,717 A | 9/1998 | Van Aerle | |
| 5,825,447 A | 10/1998 | Hanyu et al. | |
| 5,917,570 A | 6/1999 | Bryan-Brown et al. | |
| 6,249,332 B1 | 6/2001 | Bryan-Brown et al. | |
| 6,320,639 B1 | 11/2001 | Mori et al. | |
| 6,327,016 B1 | 12/2001 | Yamada et al. | |
| 6,469,763 B2 | 10/2002 | Kim et al. | |
| 7,956,980 B2 * | 6/2011 | Jones | 349/169 |

FOREIGN PATENT DOCUMENTS

| | | |
|---|---|---|
| EP | 0 545 234 A1 | 6/1993 |
| EP | 0 749 030 A1 | 12/1996 |
| GB | 2 286 467 A | 8/1995 |

(Continued)

OTHER PUBLICATIONS

Yamamoto et al; "Pretilt-Angle Control of Liquid-Crystal Alignment by Using Projections on Substrate Surfaces for Dual-Domain TN-LCD"; Journal of the Society for Information Display, San Jose, US, vol. 4, No. 2, 1996, pp. 83-87, XP000892037.

(Continued)

*Primary Examiner* — Dung T. Nguyen
(74) *Attorney, Agent, or Firm* — Nixon & Vanderhye P.C.

(57) ABSTRACT

A liquid crystal device comprises a layer (2) of a nematic liquid crystal material contained between two cell walls (3, 4) each carrying electrode structures (6, 7) and an alignment surface (20, 21). The alignment layer (20, 21) on one or both cell wall (4), is formed of a plurality of small (<15 μm) surface features each separably capable of providing a bistable pretilts and an alignment direction and collectively causing larger variations of molecular orientation across the layer (2). The device may be switched between a light transmissive state and a light non-transmissive state. The small surface features may be areas of grating (21), protrusions (25), or blind holes (26), separated by mono stable flat surfaces (Fm) coated with a homeotropic alignment layer. Preferably, the grating etc provides bistable switching operation between a low surface tilt and high surface tilt, and the low tilt alignment direction varies between adjacent grating areas.

16 Claims, 25 Drawing Sheets

FOREIGN PATENT DOCUMENTS

| | | |
|---|---|---|
| GB | 2 290 629 A | 1/1996 |
| GB | 2 312 523 A | 10/1997 |
| GB | 2318422 A | 4/1998 |
| GB | 2 338 076 | 12/1999 |
| WO | 97/14990 | 4/1997 |
| WO | 98/59275 | 12/1998 |

OTHER PUBLICATIONS

Bryan-Brown et al; "5.3: Grating Aligned Bistable Nematic Device" SID International Symposium Digest of Technical Papers, US, Santa Ana, SID, vol. 28, May 13, 1997. [ages 37-40, XP000722653.

* cited by examiner

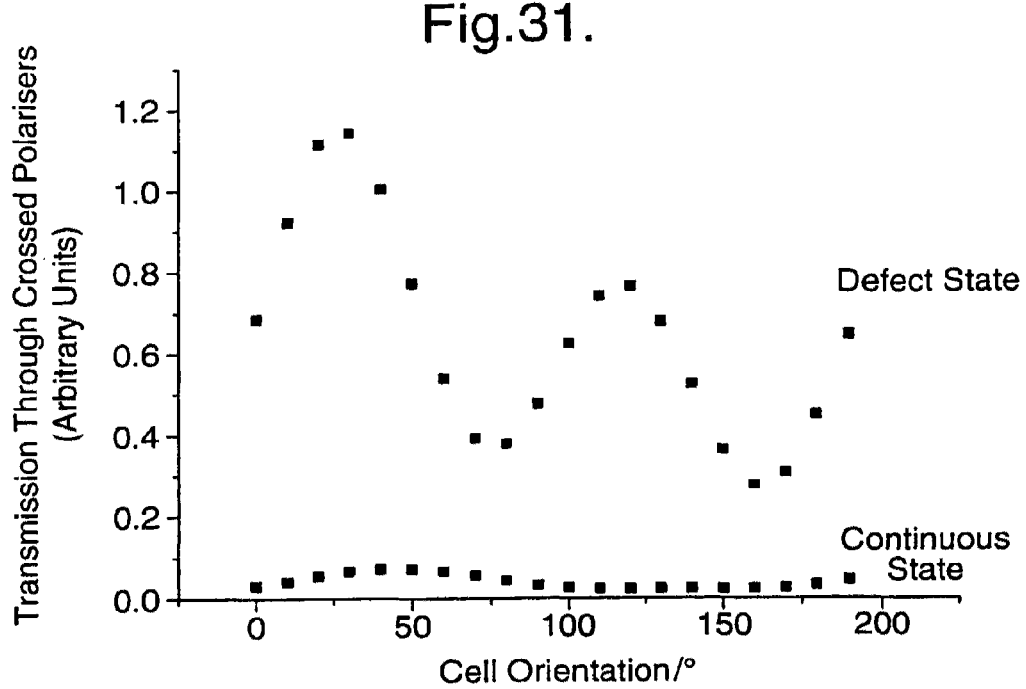
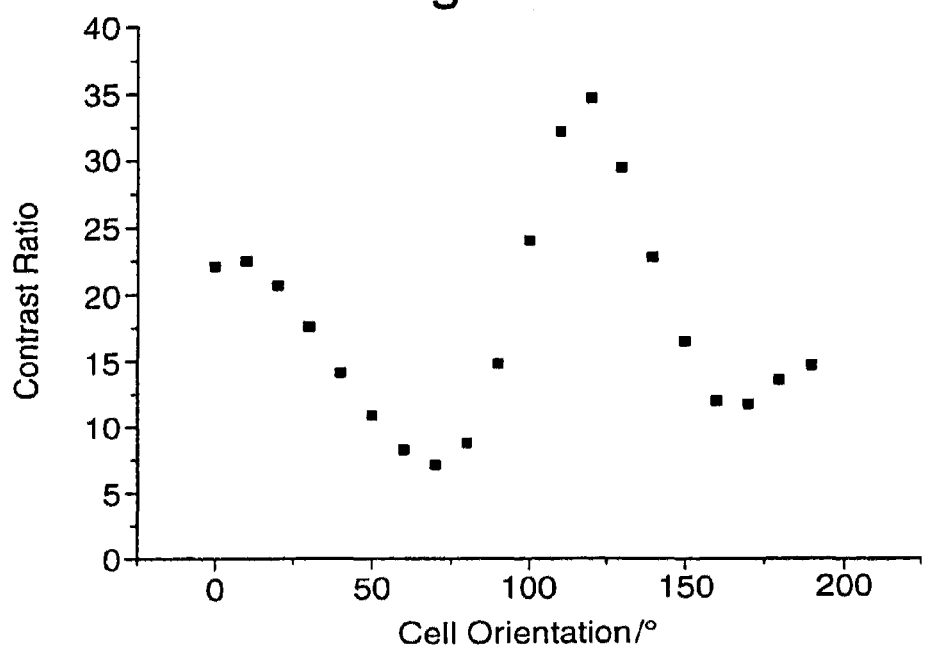

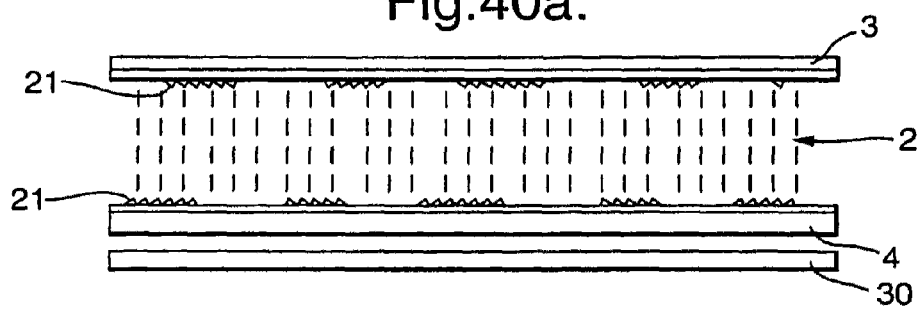
Fig.40a.
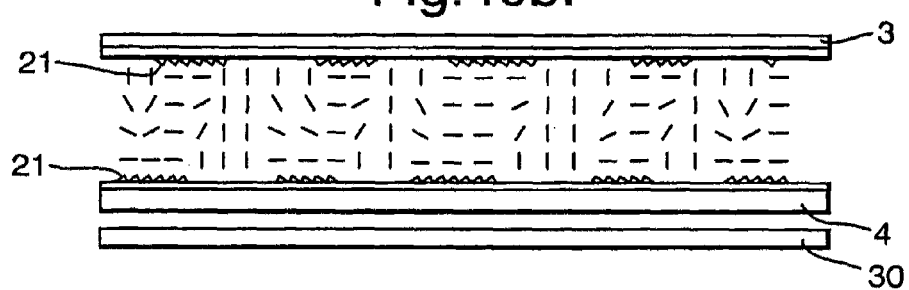
Fig.40b.
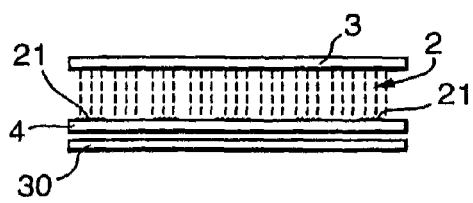 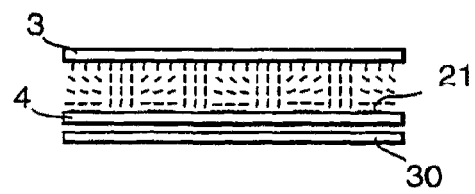
Fig.41a.  Fig.41b.

BISTABLE NEMATIC LIQUID CRYSTAL DEVICE

This application is a continuation of U.S. application Ser. No. 10/148,273, filed on May 29, 2002 now U.S. Pat. No. 7,471,362, which is a U.S. national phase of PCT/GB00/04447, filed on Nov. 23, 2000, claiming priority from GB 9928126.3, filed on Nov. 30, 1999, the entire contents of which are hereby incorporated by reference in this application.

This invention relates to liquid crystal devices, in particular modulation devices operating with either a single polariser or with no polariser in which modulation occurs by virtue of diffraction, scattering or absorption of incident light.

DESCRIPTION OF THE PRIOR ART

Liquid crystal devices typically comprise a thin layer of liquid crystal material contained between cell walls, at least one of which is optically transparent. These walls are typically coated on the internal surface with transparent conducting layers to enable external electric fields to be applied. The electrodes are often formed as a series of strips forming row or line electrodes on one wall and columns on the other wall. The intersections of rows and columns give a xy matrix of addressable elements or pixels. Other arrangements are possible, including segmented or re displays.

Some liquid crystal devices also include areas of semiconductor alongside the electrodes designed to form non-linear elements such as thin film transistors (TFTs). Other layers may be included on the inside of the device, including colour filters, planarisation and barrier layers, and absorptive or reflective layers.

The innermost surface of each pixel usually includes an alignment layer that gives the required orientation of the liquid crystal director. Typically this alignment is a layer of polymer e.g. polyimide buffed with a cloth to impart the desired direction to the surface. This gives both a preferred alignment and a surface tilt to liquid crystal molecules. Without buffing the polymer layer usually gives a planar orientation in which the liquid crystal molecules, represented by a unit vector called the director, are parallel to the local surface of the polymer. Grating surfaces formed in a layer of photo resist are also used for alignment and surface tilt; e.g. GB 2,312,523, GB 2,290,629, WO-98/59275, WO-97/39382, U.S. Pat. No. 5,808,717, U.S. Pat. No. 4,247,174. The photoresist material typically leads to a planar alignment of the director, and it is the elastic distortion close to the surface caused by the grooves of the grating surface that leads to a preferred alignment direction and pretilt.

A different type of alignment is often achieved using low surface energies, provided by, for example, surfactants. In such cases the director is locally normal to the surface, and is said to be homeotropic. In all cases, molecules of the liquid crystal material adjacent to the substrate surface transmit the preferred alignment direction to the bulk of the sample through the elastic forces of the liquid crystal.

The application of an electric field across a liquid crystal device may have any of a number of effects. Many devices rely on the inherent dielectric anisotropy of the liquid crystal ($\Delta\epsilon=\epsilon_\parallel-\epsilon_\perp$, where $\parallel$ and $\perp$ refer to directions parallel and perpendicular to the director). If $\Delta\epsilon$ is positive then the electro-static energy of the liquid crystal is minimum when the director is parallel to the applied field, whereas if $\Delta\epsilon$ is negative the director tends to lie perpendicular to the applied field. These effects are related to the RMS value of the field and as such are independent of the field polarity. Most materials are either positive or negative throughout the frequency range of operation of the device, although certain materials have been designed which exhibit "two-frequency" behaviour, where $\Delta\epsilon$ is positive at low frequencies and negative at higher frequencies, within the electrical frequency range of operation. Recently, some devices have been described which use the flexo-electric effect that occurs in many liquid crystals (R. B. Meyer, 1969, Phys Rev Lett. V22, p918). This effect is caused by polar ordering of the liquid crystal molecules induced by certain elastic distortions of the liquid crystal director field. The strength of such effects is related to the DC field and as such is dependent on the polarity of the applied electric field.

In the conventional twisted nematic device, the electro-optic modulation is due to the effect of $\Delta\epsilon$. Application of a suitable voltage causes a rotation of the liquid crystal molecules from a twisted state approximately parallel to the layer thickness (which rotates the plane of plane polarised light) to a non-rotating state approximately perpendicular to the layer (the switched state). These twisted and non-twisted states may be discriminated by viewing the cell when between polarisers, which may be orthogonally arranged or at some other suitable arrangement depending on the design of the liquid crystal cell.

Alternatively, the optical contrast may be achieved by modulating the degree of scattering of the incident light. A number of devices use this type of effect including: dynamic scattering nematics (Heilmeier et al 1968, Appl. Phys Lett v13 p46); dynamic scattering smectics (e.g. Crossland et al 1979, U.S. Pat. No. 4,139,273); thermally and electrically addressed scattering smectic A devices (e.g. Coates, Ind. Bahadur, "Liquid Crystals: Applications and Uses, Volume 1, World Scientific, 1990, p275) micro-encapsulated and polymer dispersed liquid crystals (e.g. Fergason et al 1984, U.S. Pat. No. 4,435,047, SEIKO EP-0,749,030-A1, Doane et al Appl. Phys. Lett., 1986 v48 p269 and Coates et al U.S. Pat. No. 5,604,612); liquid crystal dispersions (Hilsum, 1976 UK 1 442 360); Electric field inducement of diffraction grating of the refractive index in a nematic liquid crystal (Huignard et al 1987, U.S. Pat. No. 4,630,091, Canon U.S. Pat. No. 4,878,742); Ferroelectric Liquid Crystals with Patterned Electrodes (O'Callaghan and Handschy. 1990 U.S. Pat. No. 5,182,665).

Other liquid crystal devices operate on the principle of optical absorption anisotropy to discriminate between the different states. The performance of this type of device is usually greatly enhanced through the addition of pleochroic dyes to the liquid crystal material. An example of this type of device is the Guest Host mode cholesterics (Taylor and White 1974, U.S. Pat. No. 3,833,287).

Recently, novel grating surfaces have been described in which there is more than one stable direction of the nematic director. A bigrating structure, which induces bistable surface states with different azimuthal orientations (i.e. different orientations of the average direction of the liquid crystal molecules or director within the plane of the cell), is described in patent GB 2,286,467-A, U.S. Pat. No. 5,796,459. The local director is planar to the surface and the two surface orientations are stabilised by precise control of the grating pitches, amplitudes and degrees of blaze.

A novel surface was described in British patent application number 9521106.6, WO-97/14990, GB-2,318,422, wherein a mono-grating surface with a homeotropic local director orientation leads to two stable states with different tilt angles but within the same plane. This surface is used to form a Zenithal Bistable Device or ZBD. This device has significantly improved switching characteristics over the azimuthal bistable device of GB 2,286,467-A because the torque exerted by an electric field applied normal to the substrates acts in the same plane as the director in the two stable states. With zenithal bistable surfaces, there is at least one state, which contains defects or disclinations of the director field, and one state, which does not have these defects, and the later state is said to be continuous. For example, in GB 2 318 422 a zenithal bistable surface is described in which there is a defect state that leads to a low pre-tilt of the nematic director at some distance (usually comparable to the grating pitch) away from the grating surface, and the continuous state leads to a high pre-tilt. Note; throughout the pre-tilt is used to mean the angle made by the director from the cell plane.

Common problems to many conventional liquid crystal display devices includes narrow angle of view, lack of contrast, and reflectivity, poor switching performance, inefficiency of power usage, and difficulty of manufacture in large areas. Furthermore, liquid crystal devices are often used to control light in other applications, including privacy windows. Often, a problem with such applications is the requirement for continual application of power.

SUMMARY OF THE INVENTION

According to the present invention, the above problems are reduced by a liquid crystal cell that may be switched between two bistable states, one a highly light scattering (or absorbent) state and the other a much less light scattering (or absorbent) state, e.g. a transparent state. The scattering state is obtained by small surface features on one or both cell walls that cause localised variations of molecular orientation. Preferably the surface features are provided by a grating structure or suitably arranged surface relief structures.

According to this invention a liquid crystal device comprising a layer of a nematic liquid crystal material contained between two cell walls each carrying electrode structures and an alignment surface,
Characterised by
an alignment layer on at least one cell wall, the alignment layer having both a primary modulation and a secondary modulation,
the primary modulation being formed by a plurality of small (<15 µm) alignment areas each having a profiled surface and a homeotropic surface to provide both bistable pretilt alignments and alignment direction to liquid crystal molecules,
and the secondary modulation being formed by the spacing and/or the surface alignment directions of the small alignment areas;
whereby the device may be switched between a light transmissive state and a light non-transmissive state.

According to this another aspect of the invention a liquid crystal device comprises a layer of a nematic liquid crystal material contained between two cell walls each carrying electrode structures and an alignment surface
Characterised by
an alignment layer on at least one cell wall, the alignment layer being formed of a plurality of small surface features each separably capable of causing small localised variations of molecular orientation and collectively causing larger variations of molecular orientation across the layer whereby the local surface alignment of the liquid crystal molecules at said small surface features is homeotropic whereby the device may be switched between a light transmissive or reflective state and a light non transmissive or reflective state.

The small alignment areas (surface features) e.g. <15 µm size, may be formed by a plurality of grating areas, protrusions, or blind holes, and may be separated by areas of a monostable alignment, usually homeotropic alignment. Preferably, the alignment in the grating etc areas provides bistable switchable states to the liquid crystal material in which the bistable states have different values of pre-tilt. The alignment characteristics may vary between adjacent areas. The grating etc areas may be uniform or non-uniform in size, shape, and alignment directions. When grating areas are of uniform size, as in display applications, the variation of alignment directions may be the same for each or several areas so that a uniform overall display is produced. Within each area there may be a graded variation so that the amount of scattering is dependent on amplitude of applied voltage, thus giving a greyscale effect.

The liquid crystal material may be nematic, long pitch cholesteric, (or chiral nematic), or smectic.

The present invention uses alignment gratings similar to those described in prior art U.S. Pat. No. 5,796,459 and GB 2 318 422 on one or both internal surfaces together with additional requirements such as the alignment direction resulting from that grating in the, or one of the, low energy states is further modulated in one or more directions in the surface plane for the surface of GB 2 318 422, and the bigrating surface of U.S. Pat. No. 5,796,459 must be locally homeotropic and the bi-grating structure arranged to give two states with different pretilts. The zenithal type of bistability of GB 2 318 422 in which the two bistable states have different pretilts is preferable to azimuthal bistable of U.S. Pat. No. 5,796,459 because it allows the best electro-optical performance and it is this type that is used in the various embodiments described later.

Simple devices may be constructed in which there is monostable alignment and the electro-optic modulation results from the reduction of the refractive index variation as the liquid crystal director re-orients in response to the applied electric field.

However, significantly improved operation is possible by ensuring that the surface leads to zenithal bistability in some areas of the cell. In such devices, one of the two states is a highly diffractive, scattering or absorbent and the other state is a less diffractive, scattering or absorbent state. The two states may be selected using electrical pulses of appropriate voltage, polarity, duration and shape.

A number of properties may be varied to maximise the degree of scattering to give good brightness (and contrast) in a scattering device. This is particularly true for reflective mode devices that utilise back scattered light to give the bright state. Firstly, back scattering is maximised where the refractive index modulation occurs over length scales shorter than the incident wavelength (typically $\lambda/5$). Fabrication of such minute features in a zenithally bistable grating to induce a high degree of back scattering of optical wavelengths is difficult practically, but it has found that a satisfactory result is possible using surface features of between 0.2 µm and 2 µm pitch. This is because the defect cores stabilised at surface features, such as the peaks and troughs, provide additional scattering centres. Moreover, it has been found that the extent to which the defect core increases the degree of backscatter is related to the anchoring energy of the surface, and the elastic constants of the liquid crystal. These properties also influence the near-surface director profile of the continuous state (and hence the degree of scattering in the lesser scattering state and the contrast ratio) and the electrical switching characteristics. However, it has been found that the defect structure itself plays a secondary role in the degree of scattering and the grating structure itself is a decisive factor for controlling the degree of optical scatter. This is because the refractive index variations associated with defects etc are localised to very close to the grating surface, and the elastic distortion quickly decays to a uniform director profile within the first micron or so away from the surface. Varying the alignment itself from one part of the surface to the next ensures much greater degrees of scattering, and this is done through the secondary modulations of the grating profile.

Other important factors for maximising both forward and back scattering include the birefringence Δn and the thickness of the liquid crystal layer i.e. the cell gap, d. The birefringence should be as high as possible, but due to material limitations (such as having appropriate phase transition temperatures, chemical stability and low viscosity etc) Δn is typically between 0.18 and 0.25 at optical wavelengths. Similarly, the cell gap is limited by other considerations including switching voltage and contrast ratio. It was found that good brightness and contrast were obtained for typical cell gaps in the approximate range 10 μm≦d≦50 μm for use in the optical domain.

However, for devices which rely on the flexo-electric effect to latch between the bistable states the use of such high cell spacing compromised the device performance, making the electric field threshold higher. For this reason, cell gaps of between 3 μm≦d≦6 μm were also used. Alternatively, a two-frequency effect to discriminate between the states could be used to switch cells with higher spacings, since dielectric switching is a RMS voltage effect and independent of d. The surface pre-tilt that the grating imparts on the liquid crystal director at some distance into the cell depends on the degree of asymmetry of the grating shape.

To ensure the maximum degree of scattering, the device is designed with a close to symmetric grating shape so that the pre-tilt is close to zero. This means that for the appropriate polarisation, the two bistable states have the maximum difference in refractive index from one scattering centre to the next (i.e. almost the complete Δn).

Improved contrast is also possible by matching the ordinary refractive index of the liquid crystal to that of the grating material (e.g. photo-resist). This helps reduce scattering in the continuous state, giving a better "dark" state. Thus, careful optimisation of the liquid crystal composition, surface layer composition and the surface profile are each important factors for improving device performance.

Alternatively, the devices of the present invention may operate using the principle of absorption rather than scattering. For example, an appropriate dye is mixed into the liquid crystal before the device is filled, usually with the concentration range between 0.5% weight and 5% weight, and typically 3%. Considerations such as the liquid crystal Δn then play a lesser role, and the optical contrast and brightness are dictated by factors such as the order parameter of the dye in the liquid crystal host and dye absorption anisotropy.

A most important factor and basic principle of the present invention is the design of the grating surface, and in particular the form of the secondary modulations. Many different structures are possible, and the choice is often dictated by the application. Common to each of the structures described is that the grating surface is modulated on two or more length scales, and/or in two orthogonal dimensions parallel to the plane of the substrate.

In one embodiment of the present invention, a homeotropic mono grating structure such as that used in GB 2 318 422 consists of a single groove direction, but with two or more modulation amplitudes of different pitch (or pitches). The first modulation is a grating structure leading to the desired bistable states of differing pretilt of the liquid crystal director, whereas the second modulation, of higher pitch than the first modulation, causes areas to have either different values of pre-tilt or to give a single, mono-stable orientation of the liquid crystal director. In this fashion, the cell may be latched into two or more stable states in which there is a modulation of the cell retardation or absorption in the direction of the surface modulations.

In the preferred embodiments of the invention, the grating is modulated in this manner in two (or more) directions in the surface plane. These secondary modulations may have a pitch that is anything from equal to that of the first modulation used to align the liquid crystal molecules, to many times this distance. For example, the modulation used to obtain the bistable alignment may have periodicity L1, and the secondary modulation may have periodicity L2=10L1, for device operating at optical wavelengths. It may be preferable to use L2>10L1 for longer wavelengths (e.g. IR). Hence, the surface is arranged to provide alignment of the nematic liquid crystal molecules, which varies in direction across the surface on length scales of similar order of magnitude of the wavelength of the incident light to be modulated (that is from between λ/10 to 10λ). These wavelengths may be near UV to IR wavelengths (e.g. from 200 nm to 12 μm).

Cell walls are typically of a glass material, but may be of a rigid or flexible plastics material. For large devices, spacers may be incorporated into the liquid crystal material, or the gratings may include integral spacers. Gratings may be supplemented by internal metal or other reflectors, colour filters, polymer wall or dot spacers, absorbers, collimators diffusers sheets etc.

BRIEF DESCRIPTION OF DRAWINGS

The invention will now be described, by way of example only with reference to the accompanying drawings of which:

FIG. 31 shows the optical transmission for cell of FIG. 29 as a function of cell orientation when viewed between crossed polarisers using a ×10 objective lens;

FIG. 32 shows the contrast ratio as a function of cell orientation for the cell of FIG. 29 when viewed between crossed polarisers using a ×10 objective lens;

FIG. 40 is a schematic of another embodiment of the present invention, in which both internal surfaces of the liquid crystal device have been prepared to form zenithal bistable areas of different orientation, together with areas of monostable homeotropic alignment;

FIGS. 41, 42, 43 are cross sectional views of further forms of the invention.

Figure 1:
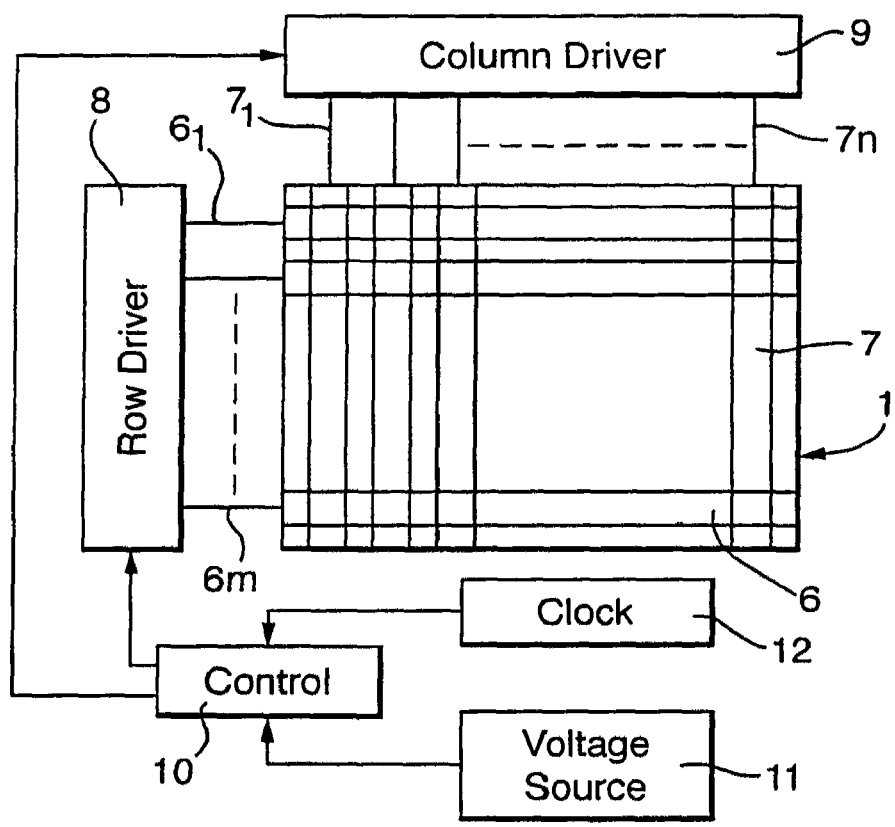
FIG. 1 is a plan view of a matrix multiplex addressed liquid crystal display.
Figure 2:
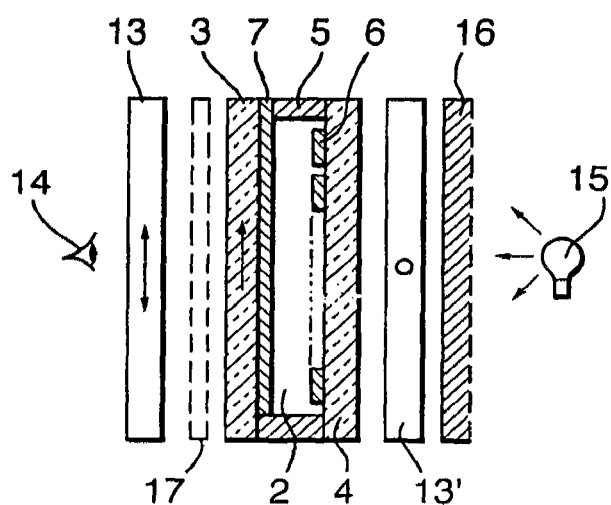
FIG. 2 is the cross section of the display of FIG. 1.

The display in FIGS. 1, 2 comprises a liquid crystal cell 1 formed by a layer 2 of nematic or long pitch cholesteric liquid crystal material contained between glass walls 3, 4. A spacer ring 5 maintains the walls typically 1 to 50 µm apart. For some embodiments a layer thickness of 1-6 µm is used; for others 10 to 50 µm spacing is used. Additionally numerous beads of the same dimensions may be dispersed within the liquid crystal to maintain an accurate wall spacing. Strip like row electrodes 6 e.g. of $SnO_2$ or ITO (indium tin oxide) are formed on one wall 3 and similar column electrodes 7 are formed on the other wall 4. With m-row and n-column electrodes this forms an m×n matrix of addressable elements or pixels. Each pixel is formed by the overlap of a row and column electrode.

A row driver 8 supplies voltage to each row electrode 6. Similarly a column driver 9 supplies voltages to each column electrode 7. Control of applied voltages is from a control logic 10, which receives power from a voltage source 11 and timing from a clock 12.

On one or both sides of the cell 1 is a polariser 13, 13'. Additionally an optical compensation layer 17 of e.g. stretched polymer may be added adjacent to the liquid crystal layer 2 between cell wall and polariser. A partly reflecting mirror or absorbent layer 16 may be arranged behind the cell 1 together with a light source 15. These allow the display to be seen in reflection and lit from behind in dull ambient lighting. For a transmission device, the mirror or absorber 16 may be omitted. Other embodiments may use two polarisers 13, and 13' as described later.

Prior to assembly, at least one of the cell walls 3, 4 is treated with alignment features such as surface relief gratings to provide a required alignment i.e. a mono or a bistable alignment with or without pretilt. The other surface may be treated with either a planar (i.e. zero or a few degrees of pretilt with an alignment direction) or homeotropic monostable surface, or a degenerate planar surface (i.e. a zero or few degrees of pretilt with no preferred alignment direction in the plane of the cell).

Such an arrangement allows each pixel to be addressed separately into both of two visually different states. Collectively the different states at each pixel provide a required display of information. Waveforms for the addressing of each pixel may be conventional. For example with a bistable grating, the waveforms may be as described in WO/005271-A1; GB patent application 99/04704.5 filed Mar. 3, 1999.

The construction of cell shown in FIG. 2 may be changed to provide a shutter, providing for example a large privacy screen. In this case sheet electrodes replace the strip electrodes, and the whole cell is switched between its two states, e.g. transparent and opaque or diffusive.

Figure 3A:
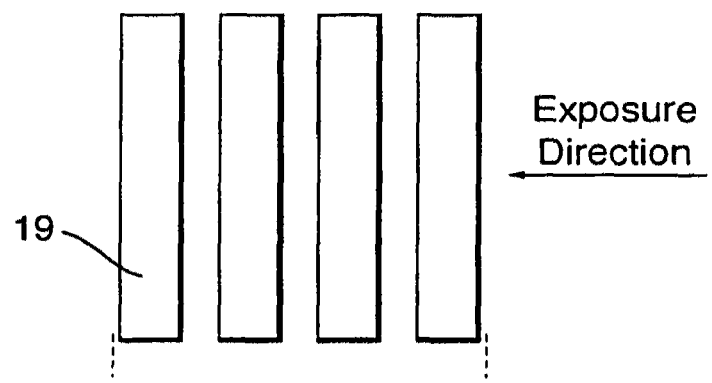
FIGS. 3a,b show use of a mask and typical direction of illumination onto photo resist used in forming a grating structure.
Figure 3B:
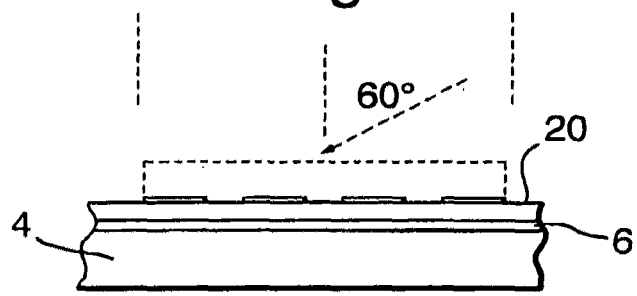

Alignment gratings may be produced as shown in FIGS. 3a,b. A piece of indium tin oxide (ITO) coated glass to form the cell walls 3, 4 was cleaned with acetone and isopropanol and was then spin coated with photoresist 20 (Shipley 1805) at 3000 rpm for 30 seconds giving a coating thickness of 0.55 µm. Softbaking was then carried out at 900° C. for 30 minutes. The exposure was carried out at non-normal incidence; in this case an angle of 600 was used. Coated cell walls 3, 4 were exposed to light from a mercury lamp (Osram Hg/100) with an intensity of 0.8 mW/cm² for a period of about 40 to 180 seconds. Mask 19 orientation was such that the groove direction was substantially perpendicular to the to plane of incidence as shown in FIG. 3.

Figure 4:
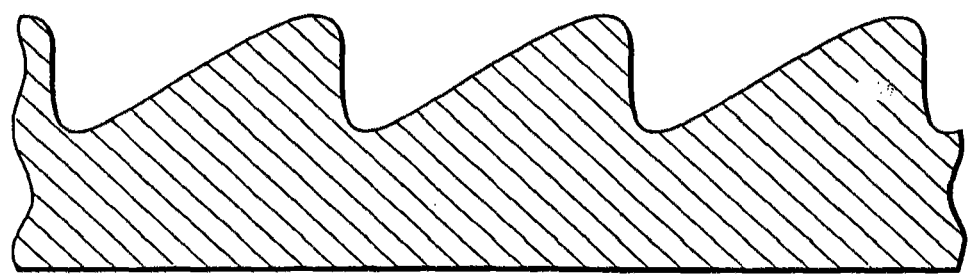
FIG. 4 shows a cross section of an asymmetric grating surface suitable for providing zenithal bistable alignment.

Exposure in this geometry leads to an asymmetric intensity distribution and therefore an asymmetric grating profile as shown in FIG. 4. Where the light is incident normal to the mask, the grating profile is symmetric (not illustrated). The mask 19 was then removed and the grating developed in Shipley MF319 for 10 seconds followed by a rinse in de-ionised water. The photoresist 20 was then hardened by exposure to deep UV radiation (254 nm) followed by baking at 160° for 45 minutes using an etchant that removes areas depending on the degree of illumination received. The final shape of the photoresist surface is a grating 21 as shown for example in FIG. 4. As described later, the entire photoresist layer 20 may be formed into one or more grating areas, or only part formed into gratings 21 and the remainder left as flat surfaces 22.

The surface 21, 22 was then overcoated with a low energy surfactant or polymer such as lecithin, so that the liquid crystal molecules tend to lie normal to the surface locally, i.e. homeotropic boundary condition. The shape (and therefore some of the properties) of the surface depends on several factors, including the depth of the grating (related to the duration of exposure), its pitch (given by the pitch of the chrome mask) and the angle of incidence for the light (e.g. the degree of asymmetry or blaze).

Other manufacturing techniques may be used to fabricate such surfaces (see for example MC Hutley, 1982 "Diffraction gratings" Academic Press pp 71-128) including scoring, embossing, printing, lithographic, laser ablation and interferographic techniques. A cross-sectional SEM of a typical grating used to obtain zenithal bistability is shown in FIG. 4. In this example, the grating pitch is about 1.2 µm and the depth is about 0.8 µm. In practice, there is some variation of these properties allowed whilst maintaining bistability of the surface. For example, bistability has been found for gratings with depths from about 0.3 µm to 2.0 µm.

Figure 5A:
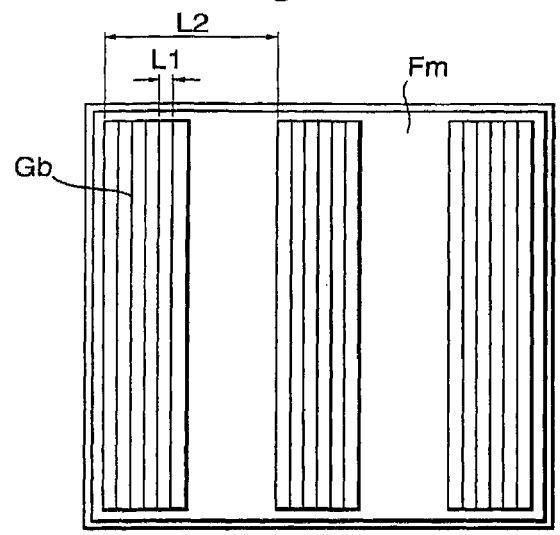
FIGS. 5a, b, c show plan and two side elevation views of one cell wall in an embodiment of the invention, this cell can modulate polarised light in a single direction.
Figure 5B:
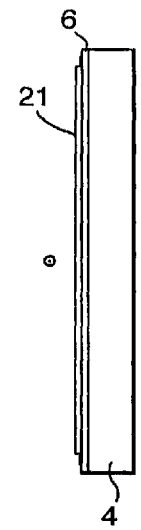
Figure 5C:

FIGS. 5 and 6 show one of the simplest embodiments of the present invention.

As seen in FIGS. 5a, b, and c a cell wall 4 carries electrodes 6 and a grating layer 21. The grating 21 has areas of primary grating Gb each of which have a similar profile to FIG. 3, for providing zenithal bistability, i.e. liquid crystal molecules can be switched between a homeotropic alignment and at or close to planar alignment. These primary grating are Gb are interspersed with flat areas Fm of approximately the same width as the primary areas. The gratings Gb have dimensions, for example, 0.3 µm high and 0.6 µm pitch L1. The modulation of gratings Gb and flat surfaces Fm, has a pitch L2 which is typically between 2 and 10 times greater than L1, dimensions of approximately L2=6 µm are illustrated). A homeotropic coating such as lecithin is applied over both the primary grating areas Gb, and also the flat areas Fm. In this fashion the liquid crystal material surface alignment varies from the bistable grating areas Gb, which may be either vertically aligned (homeotropic) or aligned parallel to the average plane of the surface depending upon, for example, the sign of the applied dc voltage, and the monostable homeotropic areas Fm which are always normal to the wall 4.

Figure 6A:
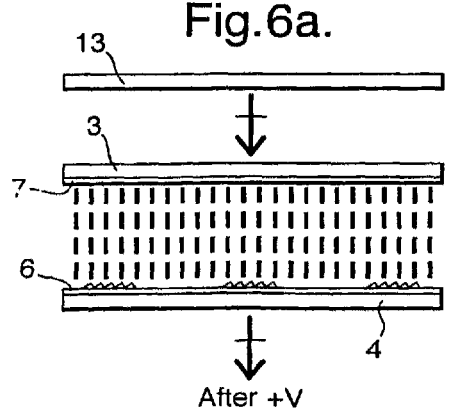
FIGS. 6a, b show schematically the two electrically switched molecular arrangements for a cell having the alignments of FIG. 5.
Figure 6B:
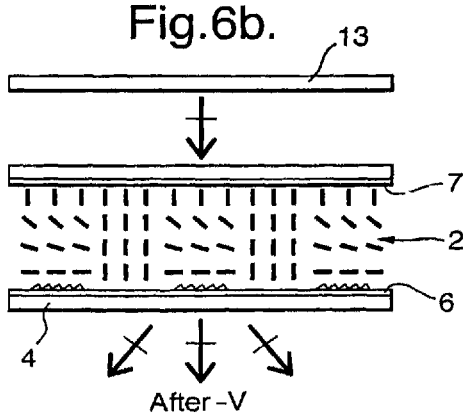

FIGS. 6a and 6b show a cell 1 formed by the wall 4 of FIG. 5 opposite a wall 3 with electrodes 7 coated with a homeotropic alignment layer 22 but no grating. The cell 1 receives plane-polarised light through a polariser 13. In this arrangement, areas of the cell influenced by the bistable primary grating Gb may be in either a high tilt (continuous) state or low tilt (defect) state, while at the flat areas Fm molecules are in a high tilt (the conventional homeotropic)_state. The primary grating areas Gb of the cell 1 are switched between the two bistable states by positive and negative unidirectional voltage pulse of suitable length applied to the electrodes 6, 7.

FIG. 6a shows a non-scattering (or diffracting) or weakly scattering (or diffracting) state in which the bistable primary grating areas G and the interspersed monostable flat areas Fm are each in the vertical (homeotropic) alignment state.

FIG. 6b shows a strongly scattering (or diffracting state) where the bistable grating areas Gb are in the low tilt state. Over the flat areas Fm the molecules remain in a homeotropic aligned state. The reason for this diffraction is due to the regular phase grating formed by the liquid crystal. Light polarised in the plane of the Figure (as indicated) experiences strips of refractive index approximately equal to the ordinary index of the liquid crystal material ($n_o$) interspersed by strips of approximately the extraordinary refractive index ($n_e$). Thus, the cell forms what may be termed a phase grating for incident light. Bragg's well-known law of diffraction gives $2(L2) \sin \theta = n\lambda$, where n is an integer. If L2 is approximately 12 µm the structure of FIG. 6 leads to first order diffraction spots of red light ($\lambda$=600 nm) at angle $\theta$ of ±1.4° and for near infra red (IR) wavelength of $\lambda$=4 µm at angle $\theta$ of ±9.6°.

Note, if the incident polarisation is parallel to grating grooves in this example (i.e. out of the paper plane in FIGS. 6a and 6b then there is no modulation of the refractive index and no diffraction. Moreover, if the polarisation is in the plane of the paper but the light is incident at an angle away from vertical then a reduced modulation of index is observed corresponding to weaker diffraction.

Figure 7A:
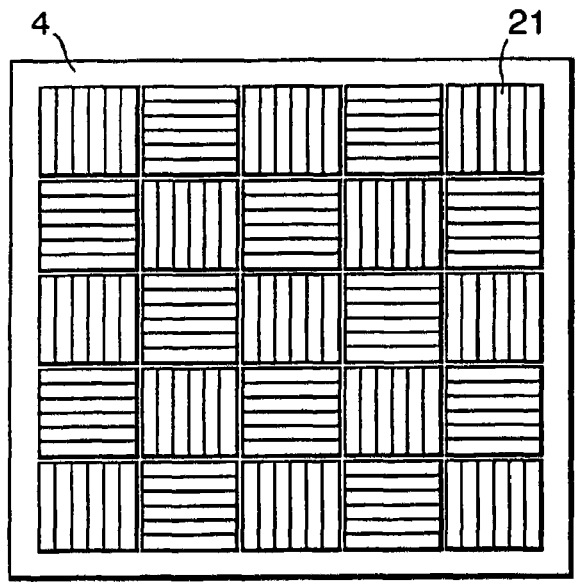
FIGS. 7a, b, c show in schematic form plan and two side elevations of gratings on a cell wall.
Figure 7B:
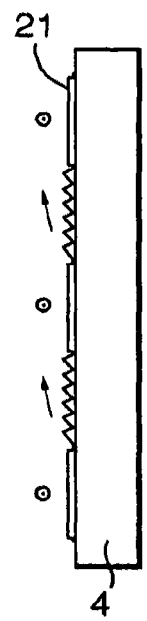
Figure 7C:
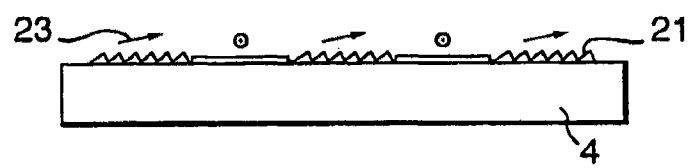
Figure 8:
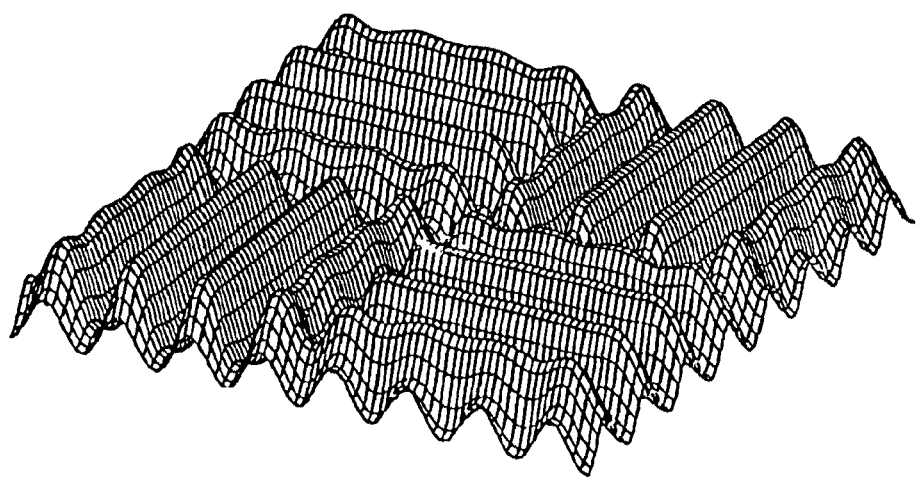
FIG. 8 shows a 2-dimensional plot of a grating profile for modulating light polarised in two orthogonal directions as used in FIG. 7.

FIGS. 7a, b, c show a another embodiment of cell wall 4, in which the grating 21 is modulated in two orthogonal directions, as shown in the 2-dimensional plot of FIG. 8. FIG. 7 is schematic and shows small square areas each with a bistable grating profile and with groove directions that are orthogonal in adjacent areas of the wall surface. In the embodiment of FIG. 7 there are no flat monostable alignment areas. This schematic representation is used elsewhere in this specification; as in FIG. 5 grating period within each small square is L1 and period of different alignment directions is L2. The grating 21 may be formed by photolithographic techniques as in FIG. 3 in two stages with a 90° rotation of the masks, or using a single mask which is specifically designed with the desired pattern. The whole cell wall 4 is coated with a surfactant.

A cell formed with a wall such as in FIG. 7 is used with a wall 3 as in FIG. 6. The cell may be switched by positive and negative dc voltage pulses, to adopt either the homeotropic alignment (non-scattering) of FIG. 6a or a scattering state similar to that of FIG. 6b.

In the example of FIG. 7 the diffracting state has refractive index modulations for incident light polarised both in the paper plane and normal to it. For example, if L1 is chosen as 0.3 µm (with a grating depth of about 0.15 µm to give the bistable alignment) and L2 is 2.5 µm then there are four first order diffraction spots for red light with angle 7° from normal.

Figure 9A:
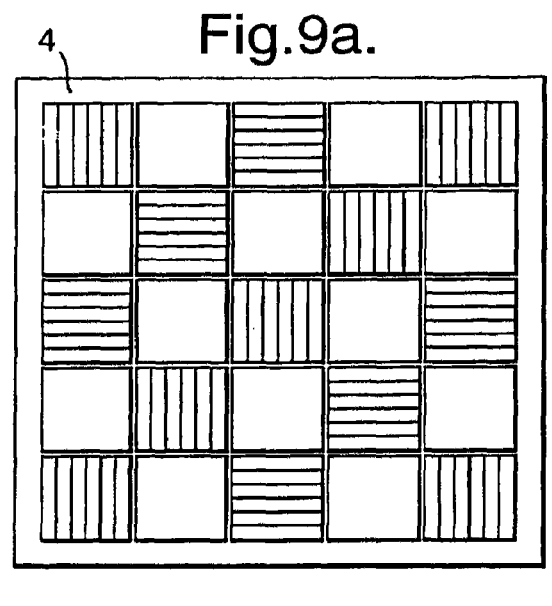
FIGS. 9a, b, c are similar to FIG. 8 but include a square area with flat surface between grating areas.
Figure 9B:
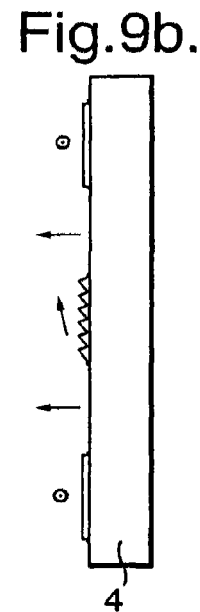
Figure 9C:
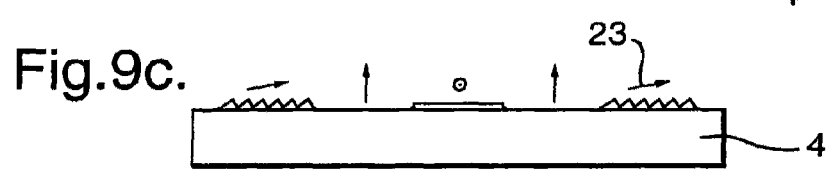
Figure 10A:
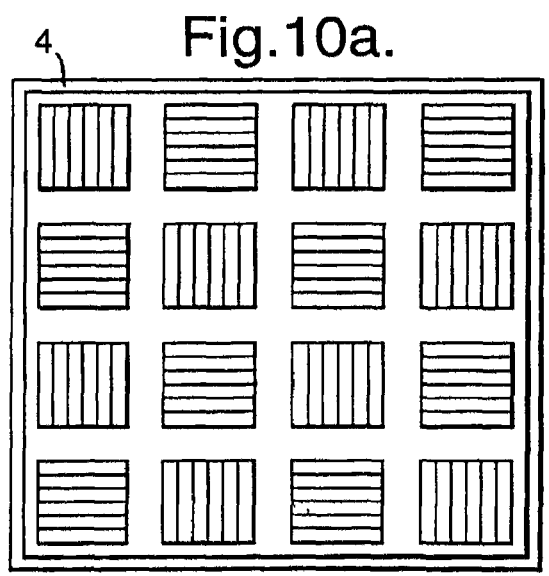
FIGS. 10a, b, c are similar to FIG. 8 but include spaces of a flat surface between each grating area.
Figure 10B:
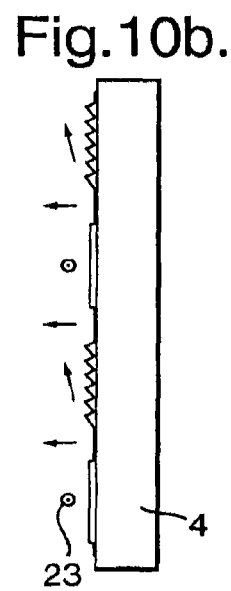
Figure 10C:
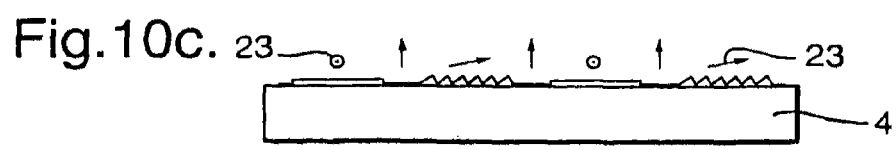
Figure 11A:
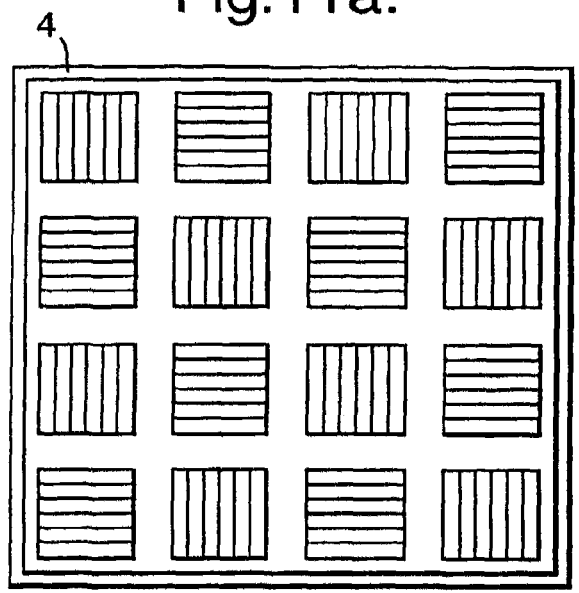
FIGS. 11a, b, c are similar to FIG. 10 but have a reversal of asymmetry between neighbouring grating areas.
Figure 11B:
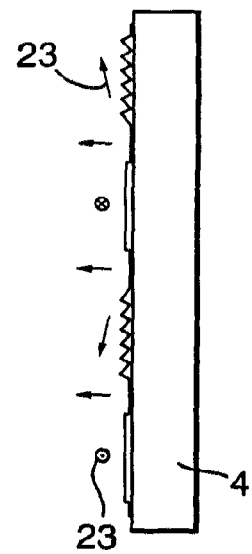
Figure 11C:

FIGS. 9, 10, and 11 are variations on the wall 4 of FIG. 7 and show three further embodiments in which there are more than two modulations in both dimensions. In these cases the small square of bistable alignment grating alternates direction of modulation, and these grating areas are interspersed with flat areas of monostable homeotropic alignment. This has the effect of increasing the refractive index mismatch between adjacent areas irrespective of the angle of incidence of the incident light.

Note that in FIGS. 9b, c the direction of pretilt on alternate grating areas is in the same direction; the same applies to FIG.

10. In contrast, in FIG. 11 the direction of asymmetry is reversed between neighbouring areas, thereby improving the angular properties of the device. This asymmetry is seen by the direction of the arrows 23 in FIGS. 11b,c when the material is in its low surface tilt switched state.

Figure 12:
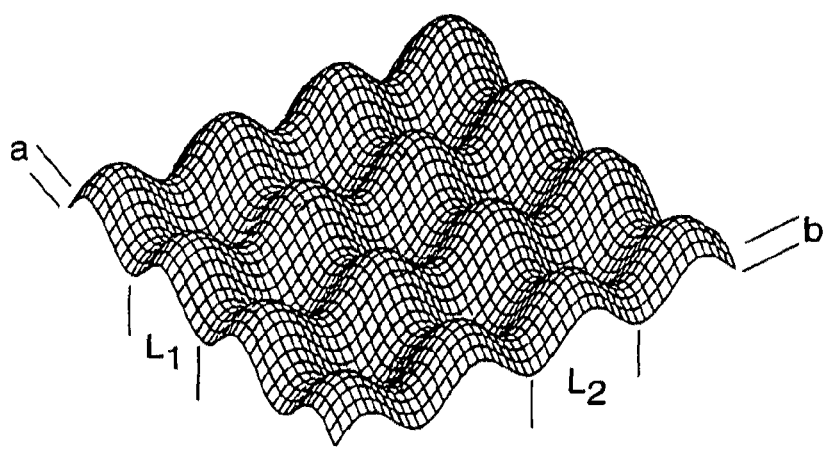
FIG. 12 shows a 2-dimensional plot of another embodiment of grating formed by a bigrating.

FIG. 12 shows a limiting case where L1=L2 for gratings in orthogonal directions (also where $L1_x$=$L1_y$); that is, a zenithally bistable bigrating is formed. Such bigratings have been used previously to give bistable surface conditions, for example in the U.S. Pat. No. 5,796,459. In that device, the bigrating leads to bistable alignment directions that have components at different angles within the plane of the substrate (i.e. azimuthal bistability). A bigrating structure leads to two orthogonal sets of grooves in the surface plane that may cause liquid crystal alignment. Alignment along one groove or the other is insensitive to the structure of each grating shape (e.g. pitch and amplitude), although the condition for bistability is dependent on the relative shapes of the two superimposed gratings. In the present invention the bigrating has the additional constraints that the surface must be overcoated with a low energy treatment, or formed from a low energy material, so that the local liquid crystal direction at the surface tends to be along the local surface normal. Together with the second constraint that both gratings which form the bigrating have a ratio of amplitude over pitch (a/L1) in the range 0.1<a/L1<2, preferably 0.25<a/L1<1, and from experience usually a/L1=0.9. These are the conditions that lead to zenithal bistability, as described in UK patent application 9521106.6, patent number GB-2,318,422.

In FIG. 12, the "valleys" and "hills" formed by the homeotropic bi-grating may contain defect loops which lead to either a net high tilt or low tilt of the director in that region. Alternatively, the director field may be continuous about each feature and lead to a uniform, high tilt of the director in the vicinity of that feature. This has the advantage over the previous embodiments (e.g. FIGS. 7-11) that it is easier to fabricate bistable surface in which the modulation distances are much shorter, and hence suited to scattering type applications, where the modulation length scales are of the same order as the light wavelength.

Figure 13:
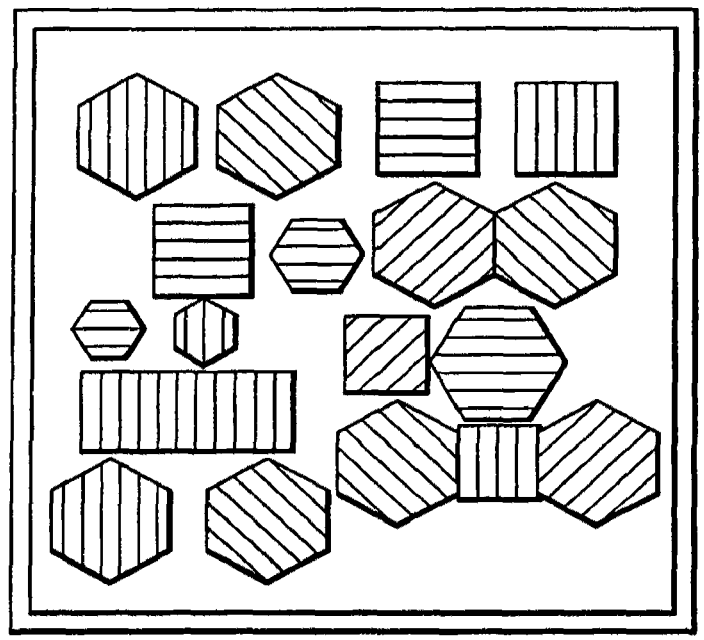
FIG. 13 shows one cell wall having regularly shaped grating areas in which the grating alignment direction and profile varies in different areas.
Figure 14:
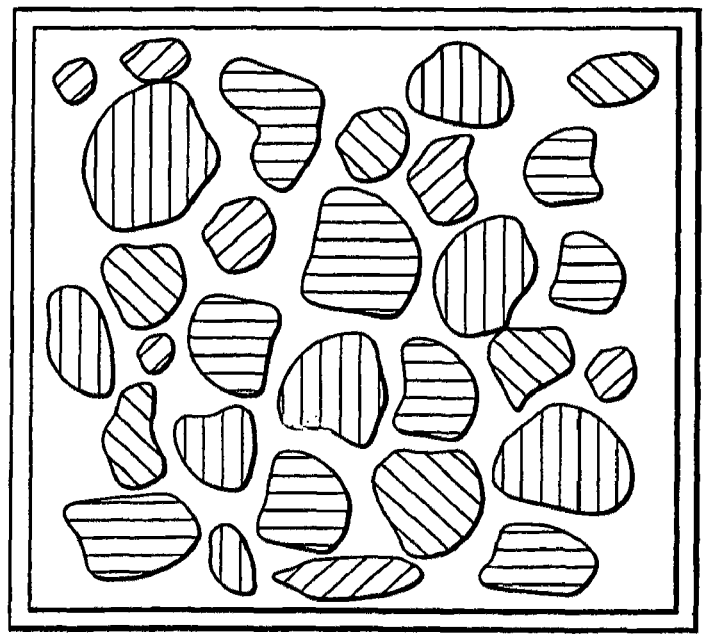
FIG. 14 shows one cell wall having irregularly shaped grating areas in which the grating alignment direction and profile varies in different areas.
Figure 15:
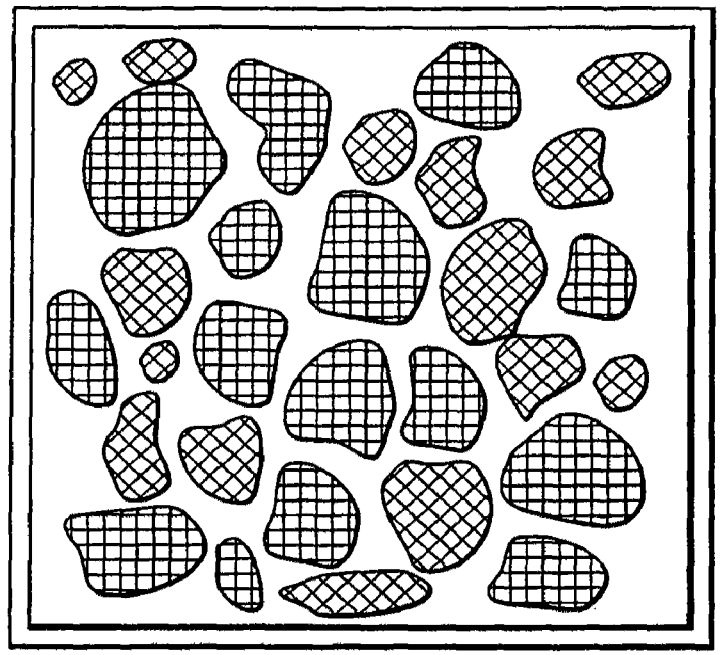
FIG. 15 shows one cell wall having irregularly shaped grating areas in which the grating is a bi-grating, with an alignment direction and bigrating profile which varies in different areas.

FIGS. 13, 14, 15 show three embodiments that use these principles to give scattering, rather than diffraction. In the previous examples, the grating areas have been regular, both in terms of the alignment grating and the longer modulation length scales. Such devices are useful in diffractive optics applications particularly when used in absorptive mode. Devices such as that shown in FIG. 7 are useful when used in absorptive mode.

For display type applications based on scattering the grating areas are preferably more irregular, as shown in the examples of FIGS. 13, 14, 15. The grating areas in FIGS. 13, 14 are of different size, spacing and alignment direction. Between the grating areas are flat areas coated with a surfactant to give monostable alignment. Note that either zenithal bistable mono-gratings (FIGS. 13 and 14) or bigratings (FIG. 15) may be used. With most grating fabrication techniques, there is enormous freedom in the shapes that are possible, and hence varying the precise structure of the pattern used. However, it was found that a good scattering state was formed easily with the simplest of designs, such as those of FIG. 14, provided each area (or scattering centre) was kept small (i.e. <10λ). Devices may have a repeat to this irregular or random pattern over much greater length-scales, so that, for example, all of the pixels over a large area display have a uniform degree of scattering in the defect state.

Figure 16:
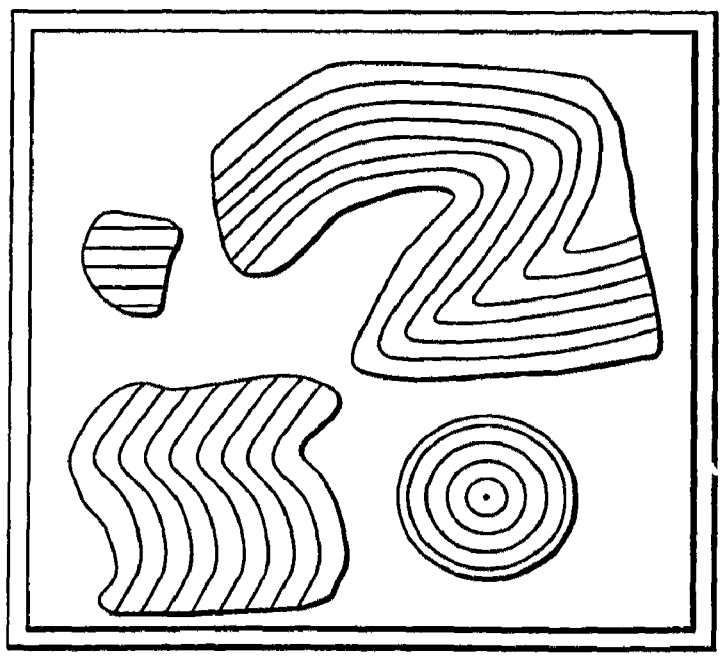
FIG. 16 shows one cell wall having differently shaped grating areas in which the grating alignment direction varies within each grating area.

FIG. 16 shows a further embodiment of the type of grating structure that leads to scattering. Again the pattern is pseudo-random, designed to give good scattering or back scattering states, but contrary to previous examples, the zenithal bistable grating itself (i.e. that with the smallest period L1) varies in direction within the plane of the wall 4. This has the advantage that very fine features may be produced, particularly at the centres of curvature for the grooves. Areas not having a grating are flat and coated with a surfactant.

Figure 17:
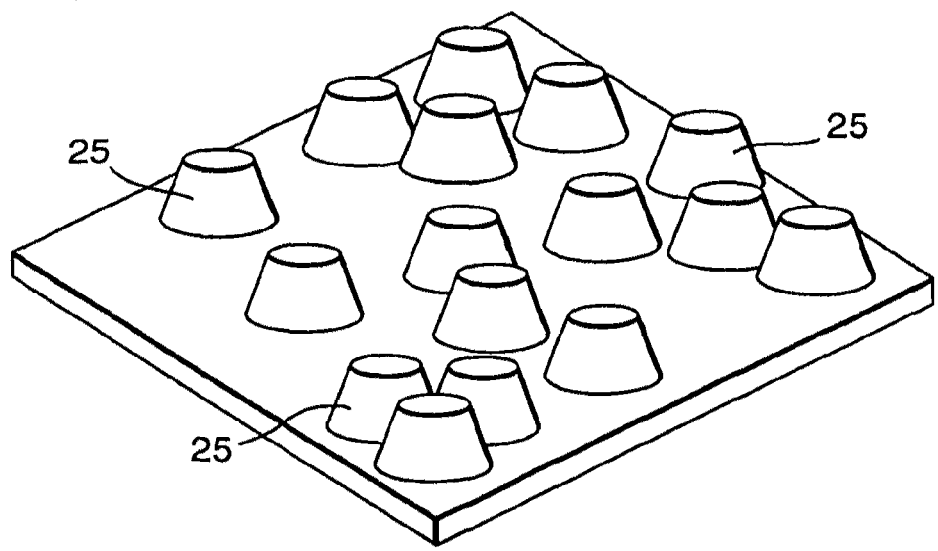
FIG. 17 shows a grating area formed by a plurality of protrusions whose width, height and spacing dimensions can provide bistable alignment.

FIG. 17 shows a modification of the FIG. 12 type of scattering surface taken to the limit, with pseudo randomly arranged protrusions 25 on the cell wall 4. Each protrusion 25 is similar to that made by the bigrating of FIG. 12. Zenithal bistable results by ensuring that the surface of each protrusion is coated or formed from a suitable low energy material to induce homeotropic alignment and that (in areas where bistability is required) each protrusion is of the correct shape and is suitably spaced from its neighbours. For example, small cylindrical bumps of similar height to diameter (h=D), spaced between 0.5D and 2D apart will typically lead to zenithal bistability (these Figures are known from the production of regular grating structures). Areas of the wall between the areas in which the protrusions 25 are suitably spaced to give bistability have local monostable homeotropic alignment, thereby helping to give improved scattering. The best performance is found from clusters of such protrusions 25 with spacings arranged to give different degrees of scattering. Also, the feature size may vary across the cell wall 4 to improve the optical performance. Typically the protrusions are from 0.1 to 2 µm high, 0.1 to 2 µm diameter, and the space between protrusions from 0.1 to 2 µm, preferably these values lie between 0.5 and 1.0 µm for the areas of each surface which are required to exhibit zenithal bistability. The protrusions may be symmetric or asymmetric in profile.

Figure 18:
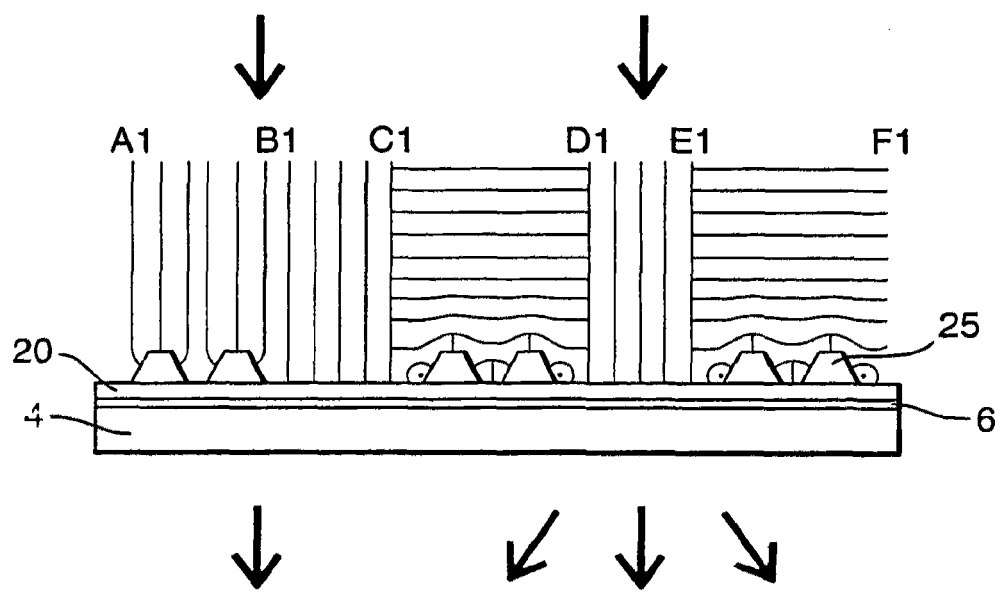
FIG. 18 shows schematically a side elevation of a cell wall having the alignment of FIG. 17 in two switched states.

FIG. 18 shows a side view of a cell wall 4 with electrodes 6 and grating layer with protrusions 25 as in FIG. 17. The protrusions 25 are shaped (height, diameter and sharpness of features) and spaced so that the bistable planar and homeotropic states have approximately equal energies to give an electrically switchable bistable operation. When the area close to the protrusions 25 are in the planar state (C1 to D1, and E1 to F1), the area acts as a scattering centre. When areas close to protrusions 25 are in their switched homeotropic state (as at A1 to B1) there is very little scattering. The scattering may be reduced even further by matching the ordinary refractive index of the liquid crystal material 2 and that of the cell wall 4. In areas where the surface is monostable and homeotropic (B1 to C1 and D1 to E1) there is little scattering.

FIG. 18 is similar to the previous embodiment shown in FIG. 6 in which L2 (3L1)/2 in the bistable region. This allows much easier fabrication and improved scattering, since the density of the scattering centres is much higher and has feature sizes that are more readily fabricated about the wavelength of the incident light. As in FIG. 12 the defect states of FIG. 18 in 2 dimensions is complicated, but may have defect loops which wind about the features, both in the interstitial troughs and about the feature tops. Domain walls usually extend from one surface to the other as indicated at C1, D1 and E1 although they occasionally cross from one area to another on the same surface.

Figure 19:
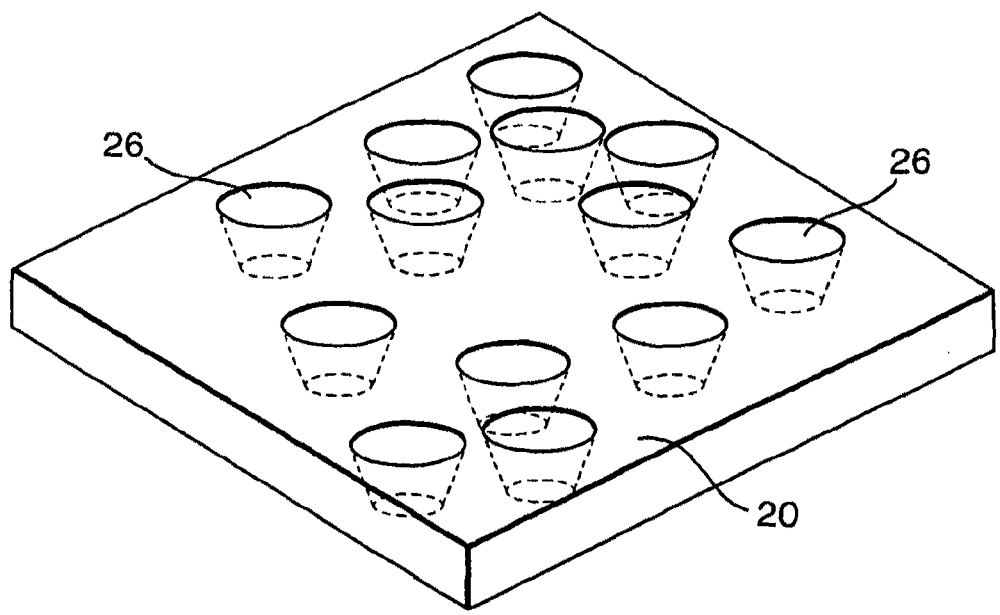
FIG. 19 shows a grating area formed by a plurality of blind holes whose width, height and spacing dimensions can provide bistable alignment.

FIG. 19 shows an area of cell wall which is a zenithally bistable surface with a relief profile which is almost the opposite of FIG. 18. Here, the scattering centres are formed from blind holes 26 in photoresist layer 20 on the cell wall 4. Again, zenithal bistability depends on the relative diameter, depth and spacings of the holes 26 plus a homeotropic coating alignment. This type of structure has a number of advantages over that of FIG. 18. Firstly, the bistability itself is less sensitive to the position of neighbouring holes, although the arrangement of holes is still an important factor for determining the optical scattering profile. Also, bistability can result in principle for features approximately a third the size of that possible using structures such as those of FIG. 18. Typically the hole diameter varies between 0.1 and 2 µm, depth varies between 0.1 and 2 µm, and the space between holes varies between 0.1 and 2 µm. The holes 26 may be symmetric or asymmetric in shape.

Figure 20:
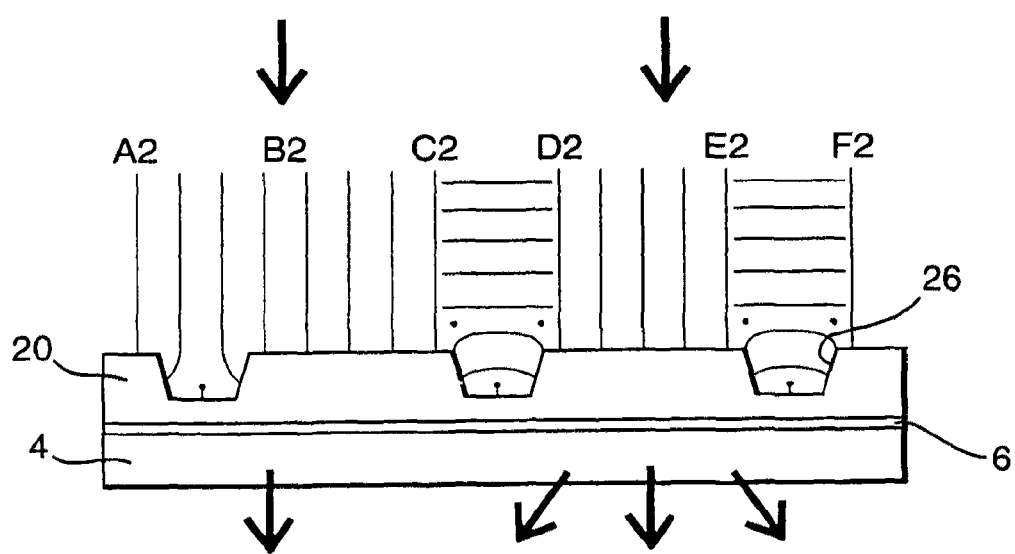
FIG. 20 shows a side elevation of a cell wall having the alignment of FIG. 19 in two switched states.

FIG. 20 shows schematically the two electrically switched bistable states of the device. Again, domain walls from one surface to the other are indicated at C2, D2, E2 and F2. Between A2 and B2 the liquid crystal material has been switched to a high tilt state providing little scattering. From C2 to D2 and E2 to F2 the material is switched into its planar state and there is scattering from C2 to F2.

In a further embodiment, not illustrated, a cell wall may have a mixture of holes 26 and protrusions 25, either intermixed or in different areas of a larger display.

Figure 21:
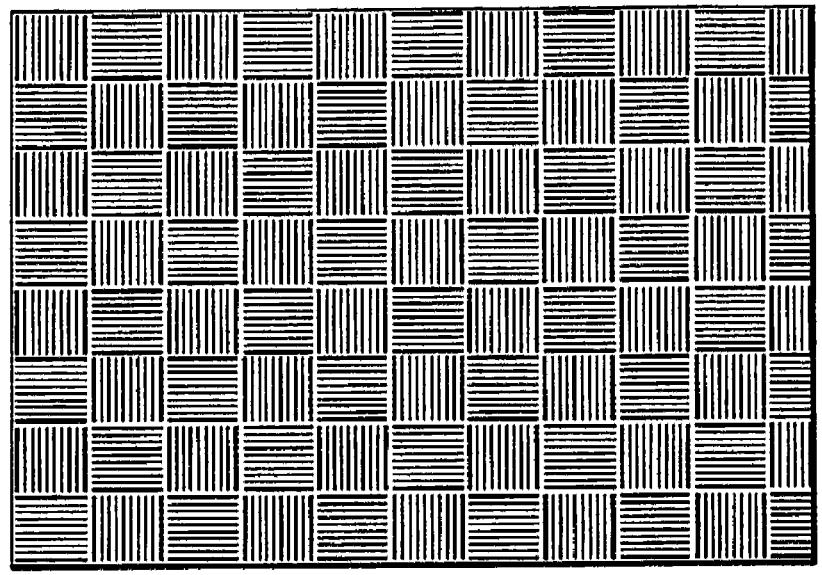
FIG. 21 shows a metal mask for producing the grating of FIGS. 7 and 8.

FIG. 21 shows a photograph of a chrome mask, which may be used to fabricate a grating structure of the type used in the embodiment of FIGS. 7, 8. The mask is split into 10 µm grids, within each there is a series of 1 µm wide chrome strips of the type indicated in FIG. 3.

Figure 22:
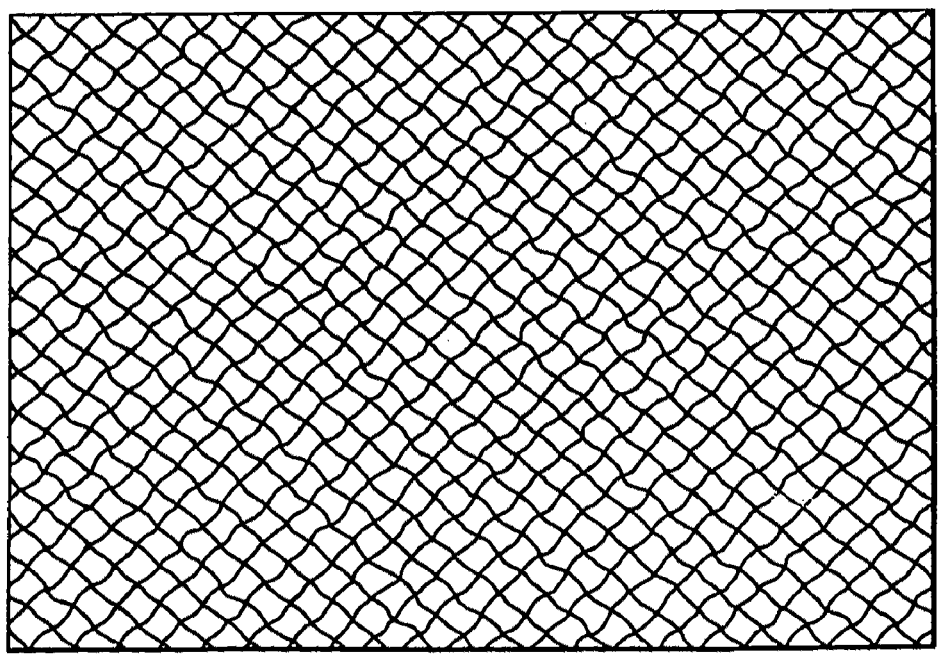
FIGS. 22, 23, 24 are photomicrographs of a bistable cell made using the mask of FIG. 21 and switched into its two states, showing latching.
Figure 23:
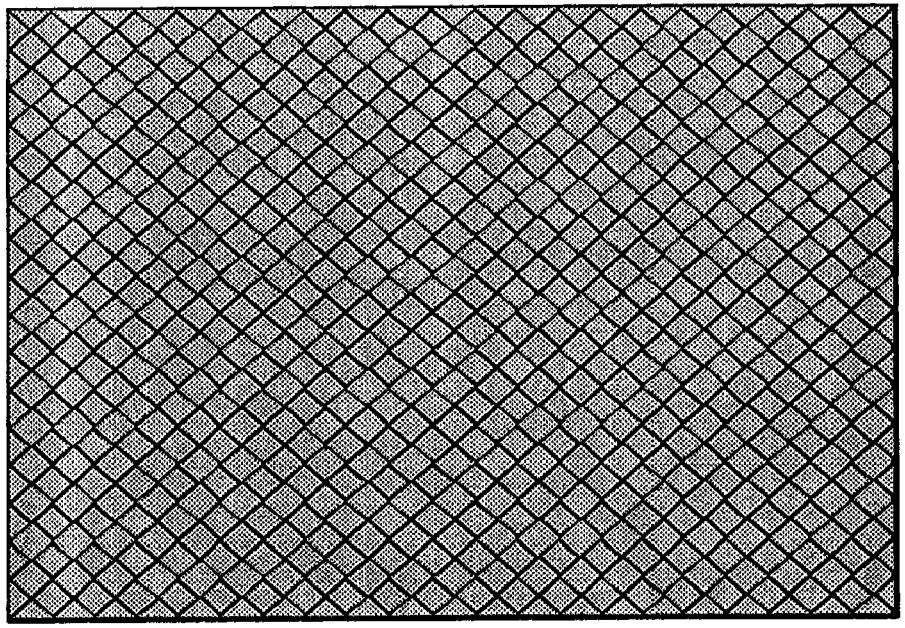
Figure 24:
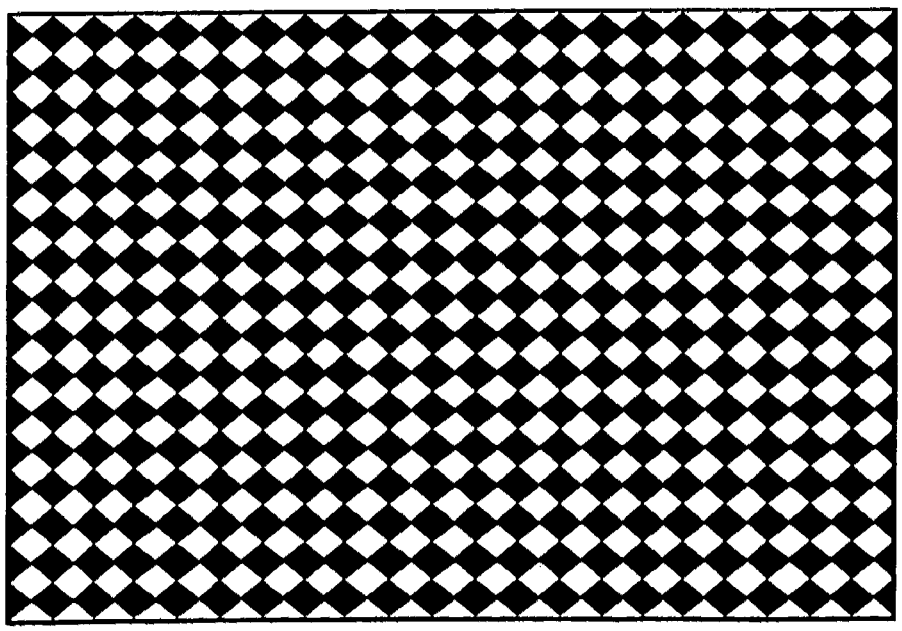

FIGS. 22, 23, 24 are photomicrographs of a zenithally bistable device made according to example 1 of the present invention. FIGS. 22 and 23 are microscopic views (×100) of the cell when between crossed polarisers, following electrical pulses of appropriate energy to latch into the high tilt alignment, and low tilt alignment states, respectively. In both cases, the cell is photographed between crossed polarisers, which are vertical and horizontal (the groove directions are at ±45° to the polarisers). The higher transmission in FIG. 22 confirms that the cell domains are fully latched from the high tilt to the low tilt state after the removal of the field. Addition of a quarter wave plate (at 45° to the polarisers) shows that the alignment directions in neighbouring domains are orthogonal, as shown in the photomicrograph of FIG. 24.

Figure 25:
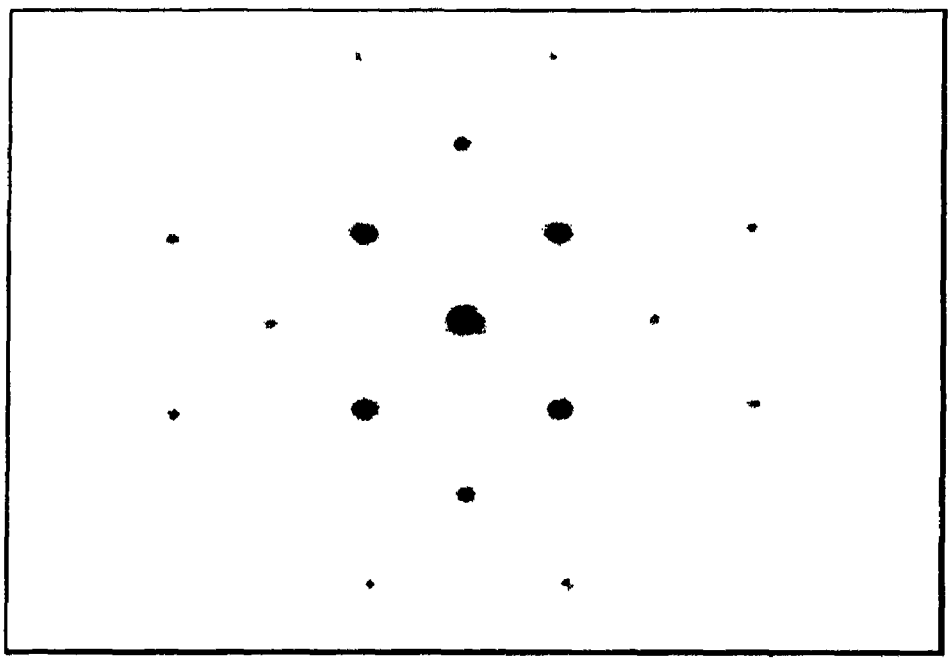
FIGS. 25, 26, 27 are the resulting diffraction patterns for the cell resulting from the device of FIGS. 22, 23 and 24.
Figure 26:
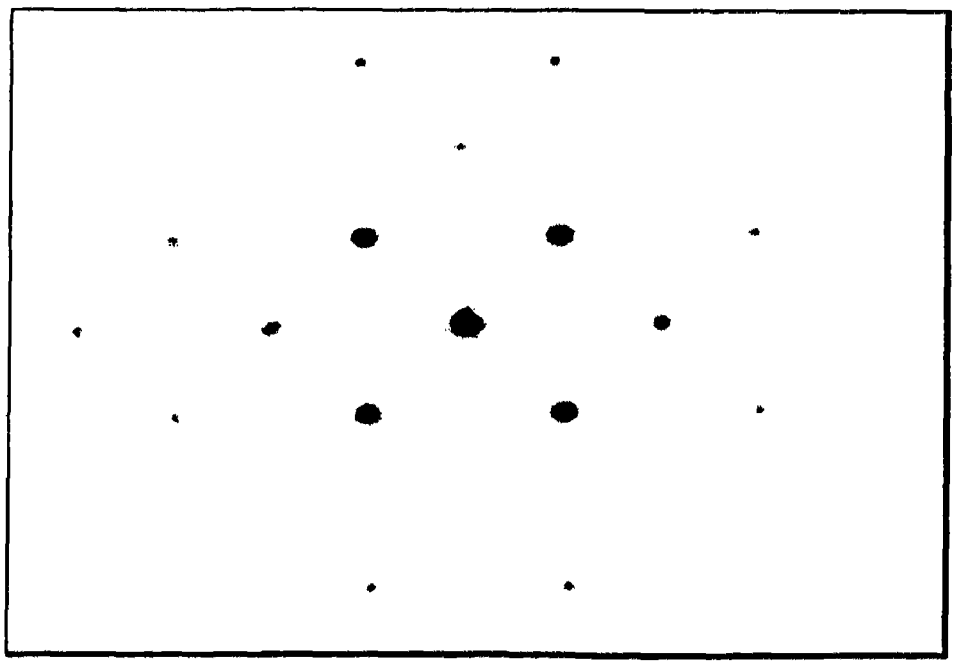
Figure 27:
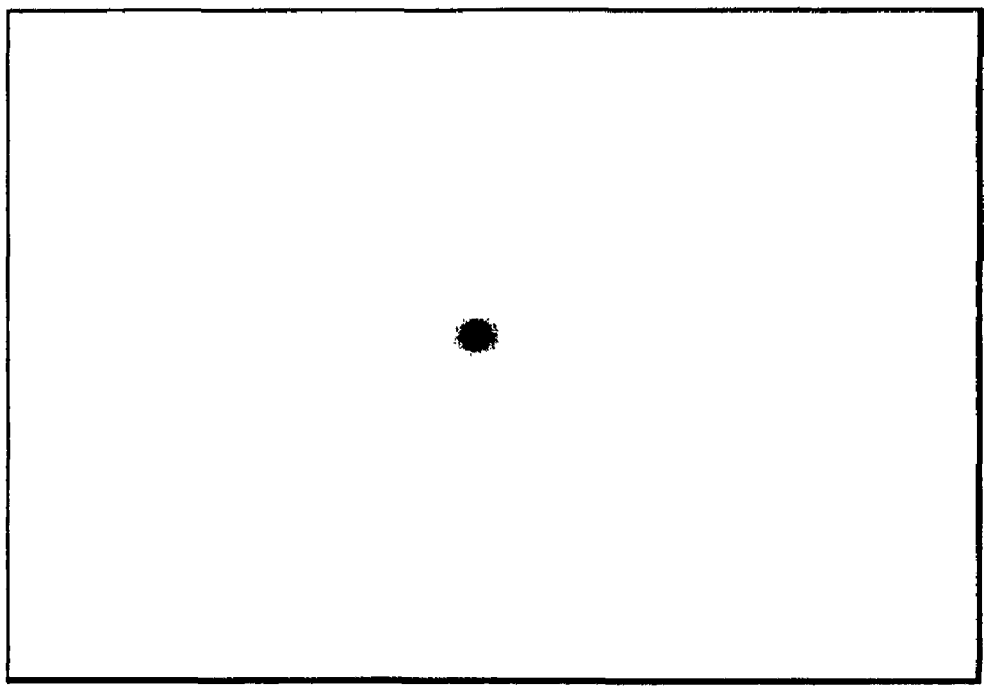

FIGS. 25, 26, 27 shows an image of the diffraction pattern produced by the device when illuminated using HeNe laser (632.8 nm at normal incidence). The image of FIG. 25 was produced by the device in the diffracting (low tilt) state, and corresponds with the view between crossed polarisers of FIG. 23. In this case the laser polarisation direction is horizontal and the domain grid runs vertically and horizontally. Several higher diffraction orders can clearly be seen in this image. If the polarisation direction is now vertical then an image is obtained with the same primary features, FIG. 26. Hence the scattering is mainly polarisation independent. Finally if the cell is switched into the non-diffracting (high tilt) state then only the zero order beam is observed, FIG. 27.

Figure 28:
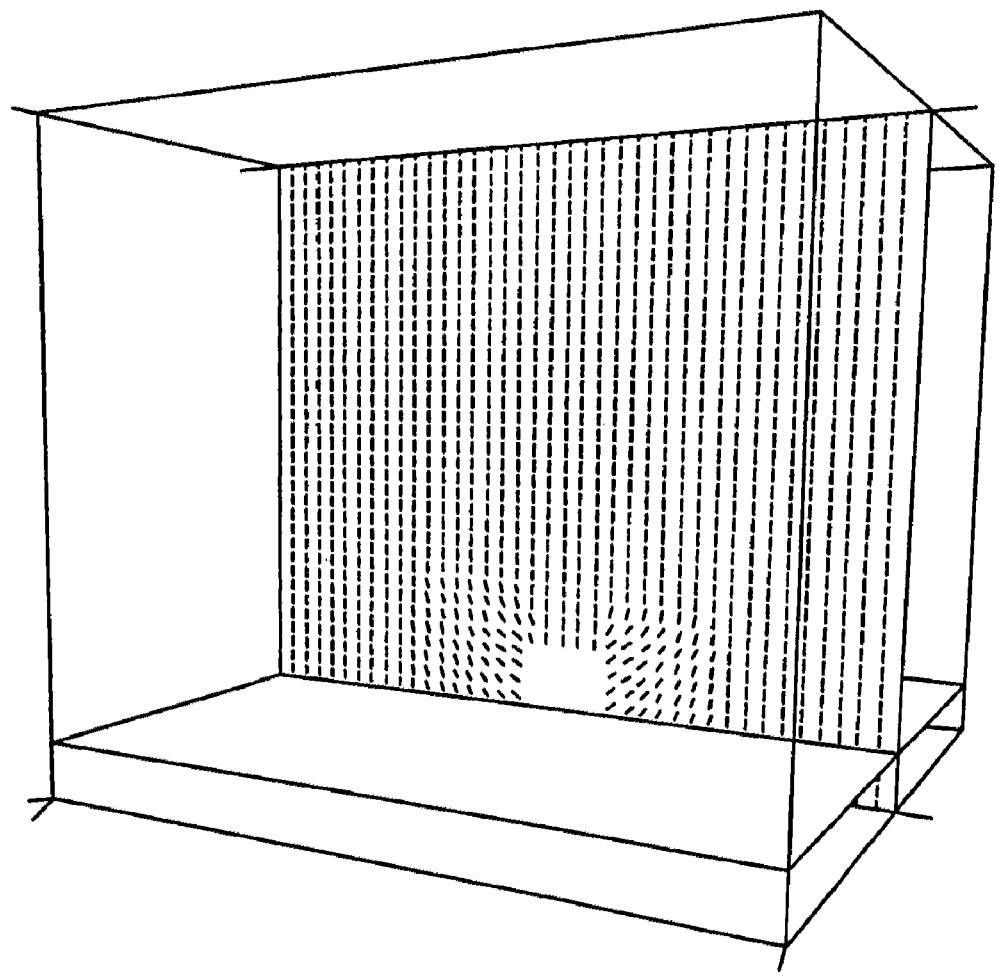
FIG. 28 is a graphical output of a two dimensional slice from a 3-dimensional numerical simulation of the director profile in the continuous state surrounding a single cylindrical protrusion with the same height and diameter.

FIG. 28 shows the results of a simulation of a nematic liquid crystal in close proximity to a single protrusion, such as those used to form zenithal bistability according to FIG. 18. The simulation was made in three dimensions, but only a single two-dimensional sheet is shown for clarity. In this example, the upper surface was also homeotropic, but the director at the vertical edges was free, so that a single protrusion was modelled. The result shows that there is a significant distortion of the director profile in the close vicinity of the protrusion, but that this quickly decays away from the protrusion to be uniformly vertical, in all directions. This is the equivalent of the continuous or non-defect state described in patent GB2 318 422. An attempt was also made to simulate the defect state. This was done by providing periodic boundary conditions at the edges of the simulation. As expected for a bistable system, one of two scenarios resulted. Either the same configuration as that shown in FIG. 28 (i.e. the continuous state) occurred or the simulation formed many defects and could not come to a satisfactory solution.

Figure 29A:
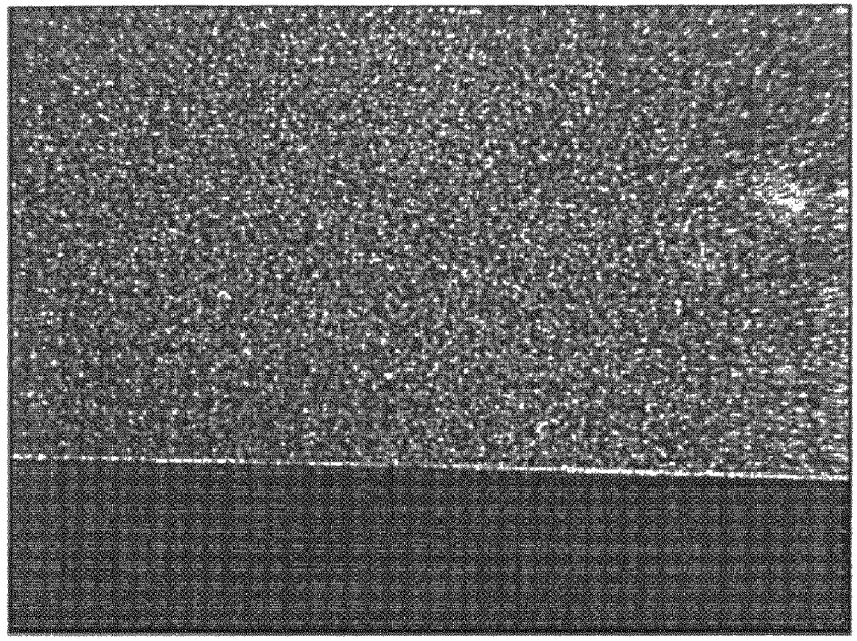
FIGS. 29a,b are photomicrograhs of the texture of a cell between crossed polarisers magnified 40 times, wherein one internal surface has the homeotropic bigrating of FIG. 12, the cell is shown in two states: a) the defect state and b) the continuous state.
Figure 29B:
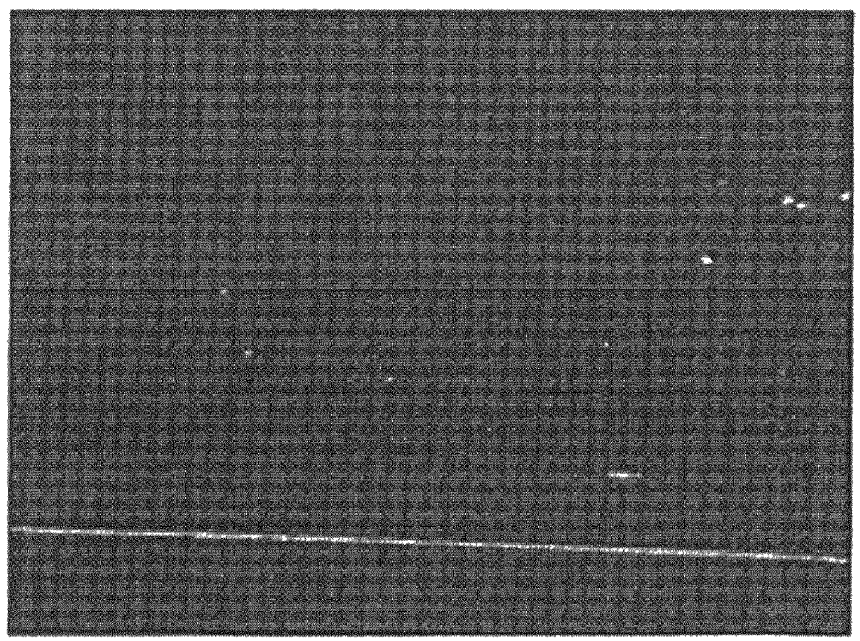
Figure 30:
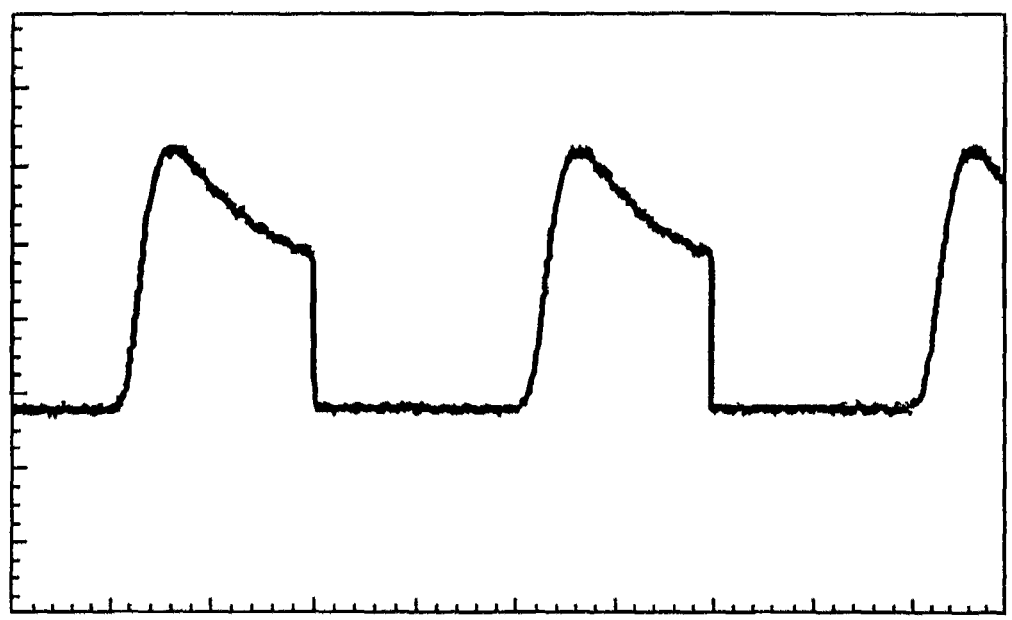
FIG. 30 is a plot of the transmission versus time for the cell of FIG. 29 when driven by 30V, 2 ms bipolar pulses, alternating in polarity with a duty cycle of 1000:1.

FIG. 29 shows photomicrographs of the device constructed from a shallow homeotropic bigrating (described in example 6 below) after latching into the defect state (FIG. 29a) and the continuous state (FIG. 29b). In both cases the cell was observed in transmission when between crossed polarisers using an optical microscope and viewed with a magnification of times 40. The photograph was taken at the edge of the grating area, which corresponds to the dark portion of the field of view at the lower portion of both photographs. This is dark between crossed polarisers for all orientations of the cell, indicating that it is an area of homeotropic alignment. This was as expected because it corresponds to a flat monostable area. The two states were latched using a bi-polar pulse of alternating polarity, and suitable voltage and duration. The optical response to this pulse sequence was monitored using a photo-diode (with eye response filter) and the resulting transmission response shown in the oscilloscope trace of FIG. 30.

After switching into both states, the transmission was monitored as the cell was rotated between the crossed polarisers and the results shown in FIG. 31. In the continuous state (lower trace) there was little change in the measured transmission, confirming that the liquid crystal molecules were now uniformly homeotropic in the bulk of the sample. When latched into the other, defect, state (upper trace), there was a much higher degree of transmission, confirming that the liquid crystal director now contain a high component in the plane of the cell. That is, the pretilt in this state is much lower than that of the previous, continuous state. As the cell in the defect state was rotated, the texture of FIG. 29a clearly changed, as different areas with different director orientations in the cell plane gave different transmissions according to their respective orientations in relation to the crossed polarisers. The angular dependence, also shown in FIG. 31 (upper trace), clearly shows that the orientation of these domains is random. This indicates that the domain walls, although based around the defect structures in the troughs between the bigrating protrusions, and around the protrusion peaks do not form a totally regular pattern, but interact with each other, and the defects of adjacent structures to form a random structure. This led to much better performance of the device than if the defects were confined to follow the regular pattern of the bigrating.

FIG. 32 shows the contrast ratio, calculated from the ratio of the results of FIG. 31. When such a device is used between crossed polarisers the average contrast is about 20. It should be noted that the measured contrast ratio depended strongly on the magnification of the sample, with the lower magnification available (times 5) giving roughly the average contrast irrespective of cell orientation.

Figure 33:
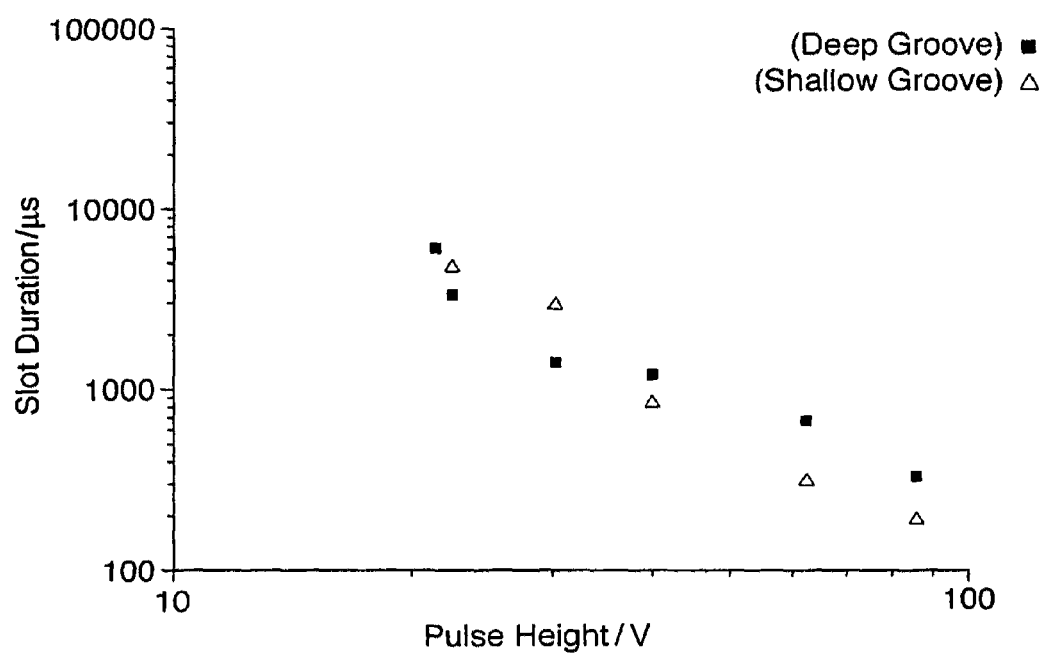
FIG. 33 is the response time versus pulse amplitude to achieve latching between both states for the cells of FIGS. 29 and 35.

The amplitude and duration of the trailing pulse required to just latch between the two states is shown in FIG. 33. The results are compared with the later example (example 7), and both cells were found to have similar electro-optic responses to those of conventional zenithal bistable liquid crystal devices of the prior art.

Figure 34A:
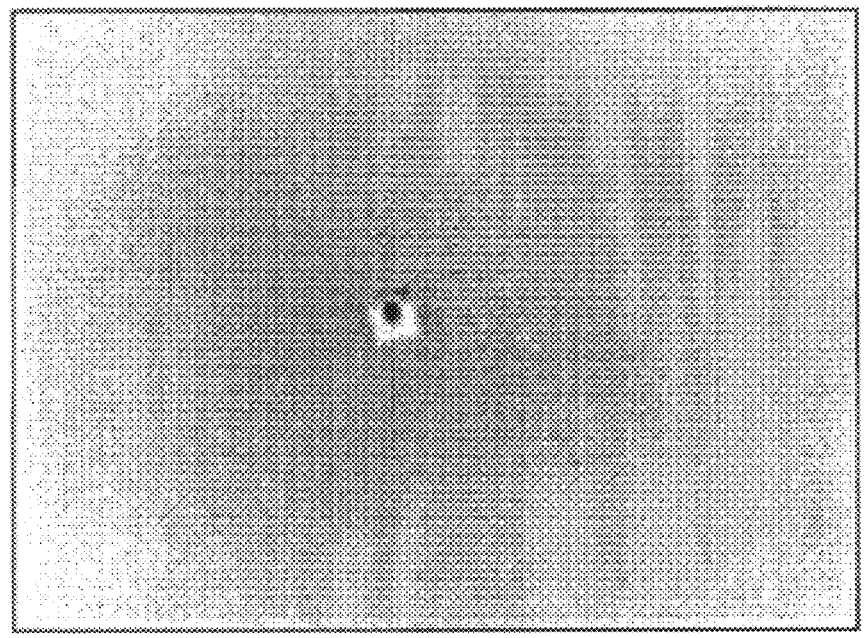
FIG. 34 is a photograph of laser light incident on screen after passing through the shallow bigrating cell of FIG. 29 after latching into a) the defect (scattering) state; and b) the continuous (non-scattering) state.
Figure 35A:
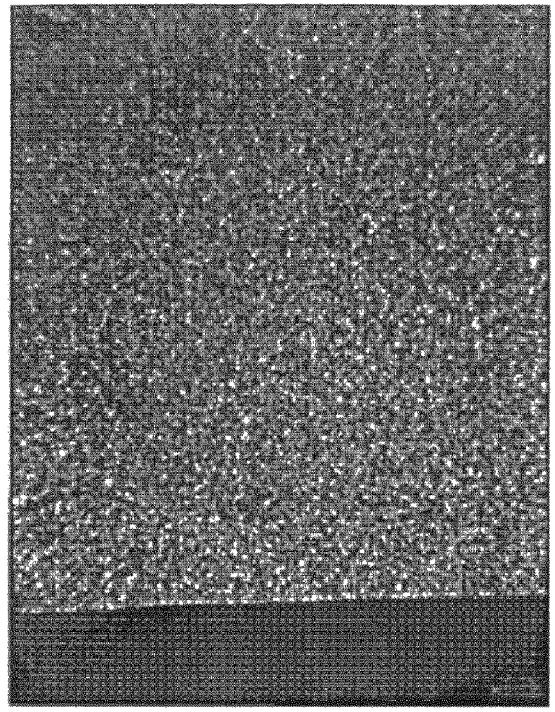
FIG. 35 are photomicrographs of a second cell, similar to that used for FIG. 29 but in which the bigrating is made deeper, showing the two states: a) the defect state and b) the continuous state.
Figure 35B:
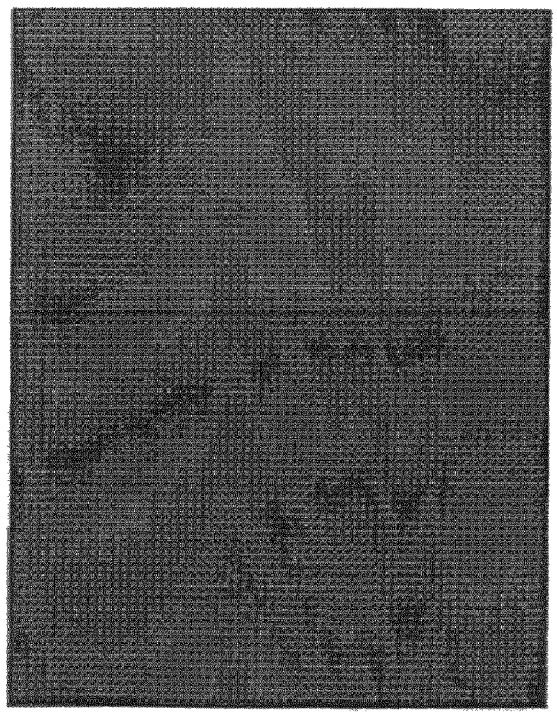

The cell of example 6 was placed in the path of a HeNe laser (wavelength 628 nm) and the resulting transmission observed on a screen. FIGS. 34a,b show the resulting pattern for the defect (scattering) and continuous (non-scattering) states respectively FIG. 35 shows the texture of the deeper homeotropic bigrating of example 7 in the defect (FIG. 35a) and continuous (FIG. 35b) states using the same experimental arrangement as described for FIG. 29 above. A comparison with FIG. 29 shows that the transmission is greatly improved and the domain size considerably smaller.

Figure 36:
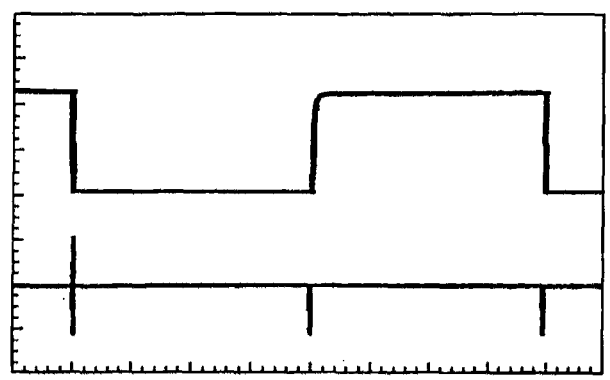
FIG. 36 shows the optical response of the cell of FIG. 35 to bi-polar pulses alternating in polarity (pulse peak amplitude is 40V and duration 500 µs)
Figure 37:
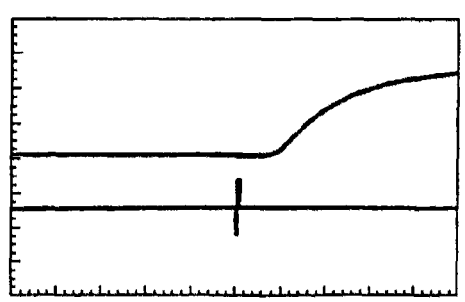
FIG. 37 shows an expanded view of FIG. 36, showing the slow transition from continuous (less scattering, diffracting or absorbing) state to defect (more scattering, diffracting or absorbing) state with a transition time of 80 ms.
Figure 38:
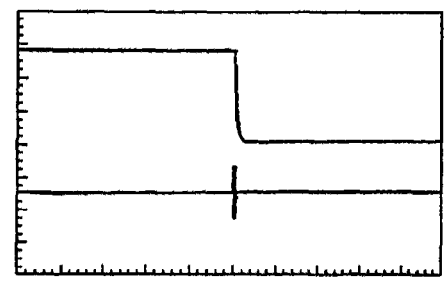
FIG. 38 shows an expanded view of FIG. 36, showing the fast defect to continuous state with a transition time of 4 ms.

The electro-optic response for the cell of FIG. 35 is shown in FIGS. 36, 37 and 38. This shows that the bistability was improved over that of the shallow bigrating shown in FIG. 30. FIG. 36 shows the optical response of the cell of FIG. 35 to bi-polar pulses alternating in polarity (pulse peak amplitude is 40V and duration 500 µs). The slow transition from continuous to defect (FIG. 37) and the faster response back to the continuous state (FIG. 38) are also both consistent with the prior art for a zenithal bistable device.

Figure 34B:
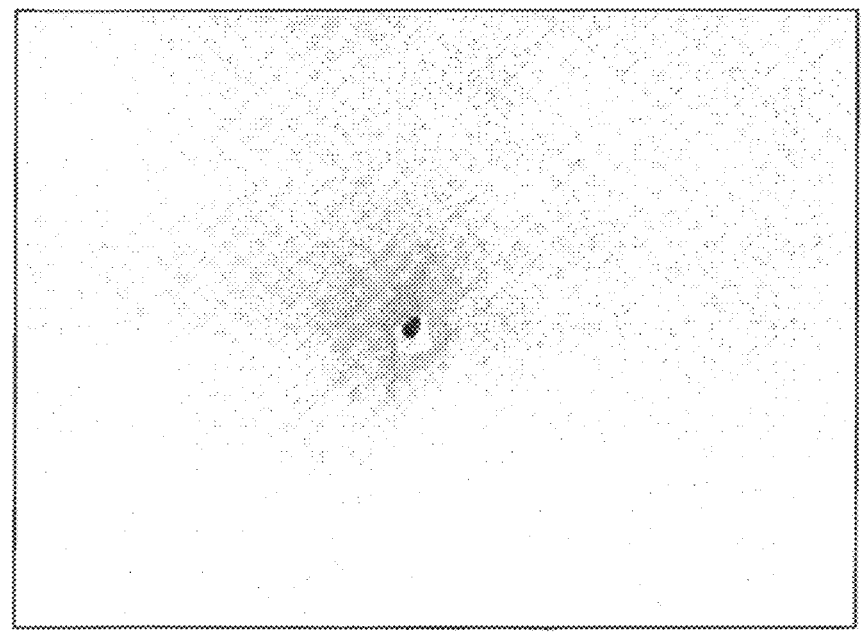
Figure 39A:
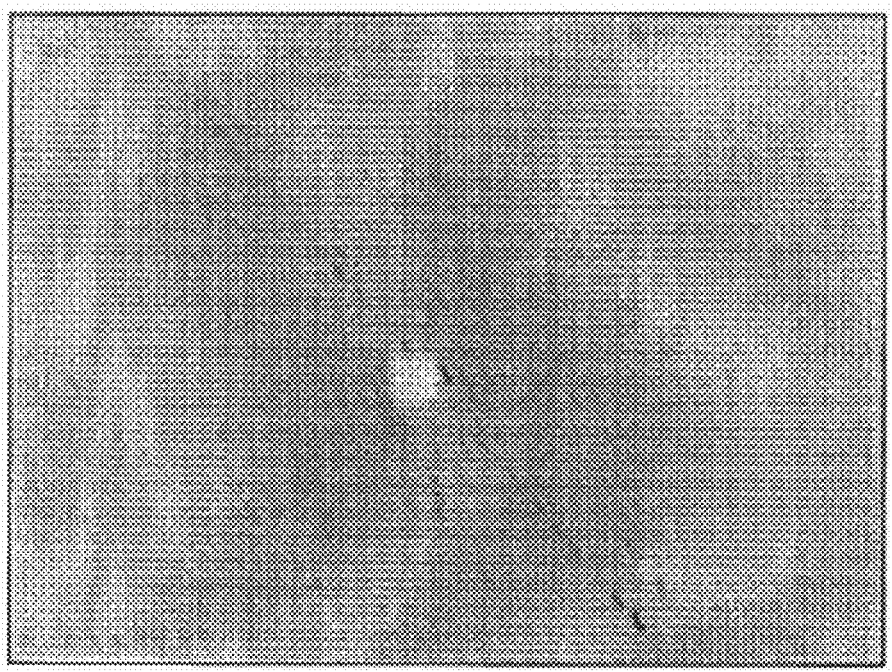
FIG. 39 is a photograph of laser light incident on screen after passing through the deep bi-grating cell of FIG. 35 which has previously been latched into a) the defect (scattering) state and b) the continuous (non-scattering) state.
Figure 39B:
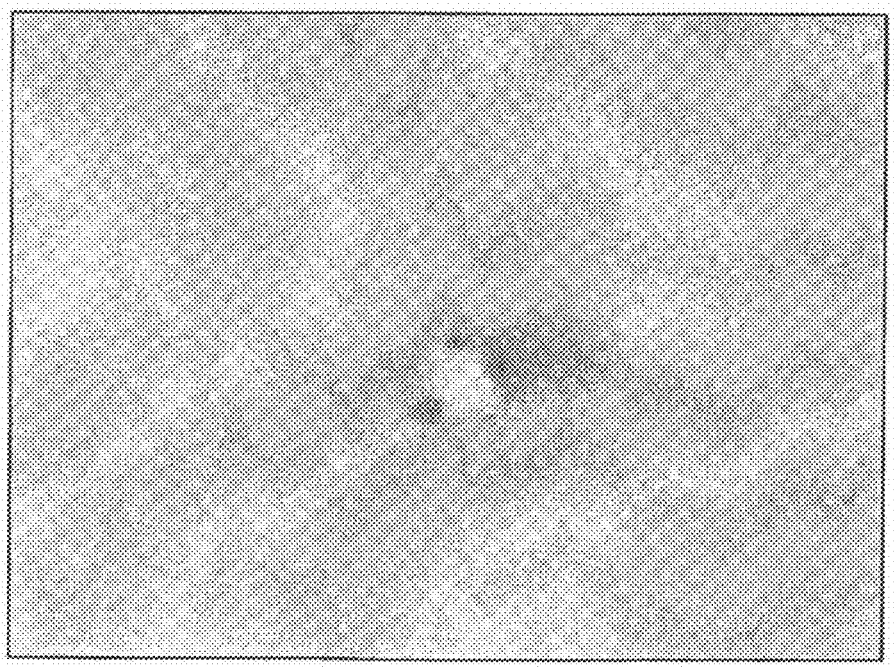

FIGS. 39a,b show the difference of laser light scattering for the cell of example 7 in the two states. Comparison with that of the shallow grating (FIG. 34) shows that the degree of scattering in the defect state (FIG. 39a) was considerably improved, whilst maintaining the very weak scattering of the continuous state (FIG. 39b).

FIGS. 40a,b show a device similar to that of FIG. 6 with like components being given like reference numerals. The device has walls 3, 4 containing liquid crystal material 2, and a zenithal bistable grating structures 21 on the inner surface of both walls 3, 4 with a homeotropic alignment on the walls between the gratings. Electrodes are not shown, but are as in FIG. 6. Behind the cell 1 there may be a back plate 30. The plate 30 may be absorbent, of one or more colours, and may be uniform or pixelated with different colours or different amounts of absorbency or reflection in each pixel. The liquid crystal material may be nematic, cholesteric, long pitch cholesteric, with or without a dichroic dye additive.

The diagram illustrates areas of grating and flat homeotropic areas on both surfaces, in which the grating orientation are confined to the plane of the page. More usually, the grating vary in all directions parallel to the plane of the device. Moreover, there may be no matching of the top and bottom surfaces, to increase the amount of defects in the bulk of the cell when both surfaces are in the defect state. FIG. 40a shows the condition when both surfaces are in the high pre-tilt state. This gives uniform homeotropic alignment throughout the cell, and no scattering is observed. FIG. 40b shows a possible director profile when both surfaces are in the low tilt, defect state. This can give a significantly higher degree of scattering than the previous embodiments of the invention.

It is important to realise that a cell designed according to FIG. 40 will not latch between the two states shown when switched by DC fields, such as the mono-polar and bipolar pulses used in all previous examples given in this invention. This is because the electric field is applied across the cell, so that a DC pulse of a given polarity results in opposite field directions at the two surfaces. Hence, the device is latched between one surface low tilt the other surface high tilt by a DC field. This problem is removed by using a two-frequency nematic liquid crystal such as TX2A obtained from Merck. Rather than coupling to the flexoelectric effect inherent in the material, this uses the fact that at low frequencies, the material has a positive dielectric anisotropy and the RMS applied voltage leads to the high tilt state at both surfaces, FIG. 40a. This is because the lowest electrostatic energy state during the application of the low frequency field is with the director parallel to the field direction, which is approximately along the surface normal. When of sufficient voltage, the applied field latches the director close to the grating surface into the continuous state, which has the highest component of the director parallel to the field direction.

Alternatively, a high frequency (typically 50 kHz or above for TX2A, which has a crossover frequency of 6 kHz at 25° C.) latches into the low tilt state at both surfaces, forming the state shown in FIG. 40b. This is because the lowest electrostatic energy then has the director perpendicular to the applied field, thereby latching the director configuration with the lowest tilt if the voltage is sufficiently high.

Figure 42A:
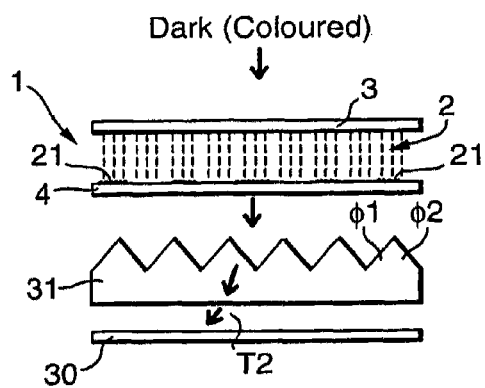
Figure 42B:
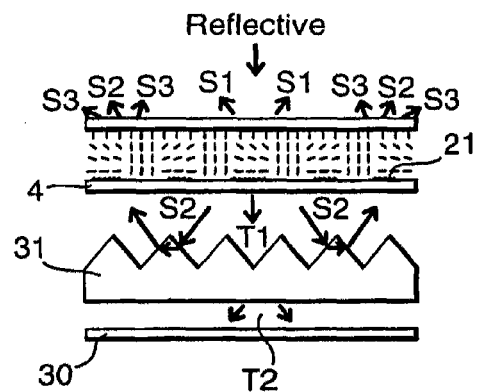
Figure 43:
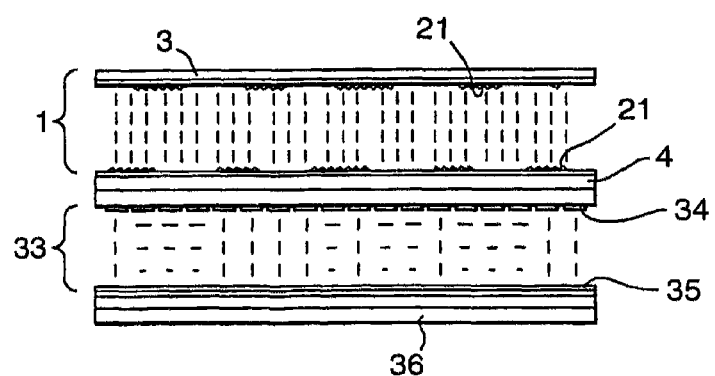

FIGS. 41, 42, 43 show cross sectional views of further embodiments. The simplest type of arrangement is a simple switchable scattering or diffusing device, wherein different degrees of scattering are maintained after application of switching voltages has terminated; i.e. the device is bistable.

FIGS. 41a,b show a device similar to that of FIG. 6 with like components being given like reference numerals. The device has walls 3, 4 containing liquid crystal material 2, a homeotropic alignment on the inner surface of wall 3 and a grating structure 21 on the inner surface of wall 4. Electrodes are not shown, but are as in FIG. 6. Behind the cell 1 is a back plate 30. The plate 30 may be absorbent, of one or more colours, and may be uniform or pixelated with different colours or different amounts of absorbency or reflection in each pixel. The liquid crystal material may be nematic, cholesteric, long pitch cholesteric, with or without a dichroic dye additive.

FIG. 41a shows one switched state where all liquid crystal molecules are in a high tilt switched state. FIG. 41b shows the other switched state where selected areas are in a planar state. The device may be switched between a scattering device, FIG. 41b, or a reflective device, FIG. 41a, where the device appears the same colour as the back plate 30.

Alternatively, the liquid crystal material 2 includes a dye and the back plate 30 is a reflector. In this case the uniformly high surface tilt state of FIG. 41a has a high reflectance, and the variable planar state of FIG. 41b absorbs incident light, thereby giving optical contrast.

FIGS. 42a,b are similar to FIGS. 41a,b with the addition of a micro prism sheet 31. This enhances backscattering in a similar fashion to that described by a Kanemoto et al. In Proceedings of the International Displays Research Conference (1994) pp 183-186, Monterey, Calif. USA 10 13 Oct. 1994. The device is switched between non-scattering, FIG. 42a, and scattering, FIG. 42b, states. In this scattering state some light incident on the device close to the normal is back scattered, but the majority is forward scattered. This results in very poor contrast of the display. However, incorporating one or more prism sheets as shown increases the effective angle of light transmitted though the device and prism array combination. In the zero or weakly scattering state, this merely results in a slight loss of device resolution, whereas for the more strongly scattering state the transmitted angle becomes sufficiently high to cause total internal reflection at the back surface of the prism array. In this manner the degree of back scattering is enhanced, to the detriment of device resolution. Further enhancements are possible by using a second prism array crossed with respect to the first.

FIG. 43 shows another embodiment comprising a conventional twisted nematic device cell 33 having electrodes 34, 35 arranged to give a pixelated display and a reflective (or semi reflective) back plate 36. Above the cell 30 is a device 1 of the present invention, somewhat similar to that of FIG. 40 with walls 3, 4 and gratings 21 on both walls 3,4. Bistable grating 21 areas on one wall are partly opposite flat areas of the other wall.

The convention cell 33 has high resolution and low parallax operation in a reflective or transflective mode. However, if viewed from a directional (non-diffuse) light source, the display will suffer from highly specular reflection and resulting illegibility. This is conventional overcome using a fixed diffuser at the front of the device. In the present invention, the device 1 acts as a variable diffuser, so that the combined optical properties may be readily adjusted with insignificant increase in the power-dissipated by the complete display. The device 1 may be a single shutter covering the whole area of the display, or may be selectively switchable in different areas.

One known switchable diffuser is described in U.S. Pat. No. 5,831,698.

Further details of fabrication of gratings and cells are given below.

EXAMPLE 1

Conventional contact photo resist techniques (such as that shown in FIG. 3) can be used to produce gratings such as that of FIGS. 5, 7, 8, 9, 10, 11, and 12. For cases where there are two orthogonal directions each with pretilt in the defect state arising from a degree of asymmetry or blaze to the grating, the light should be incident at an angle to the normal of surface, and at an azimuthal angle to the direction of both gratings. Cases where the pretilt direction varies over the grating, such as that of FIG. 11, are more difficult to fabricate by such methods, and are more readily made using multiple beam interferographic methods. Structures such as those of FIGS. 13, 14, 15, 16, 17, 18, 19, and 20 may also be fabricated using contact lithography, but then result either in zero pretilt (if normal incidence of the light used to cross-link the photoresist is used) or a pretilt which varies with grating direction (this leads to a variable switching threshold which may be undesirable for some applications).

In the first example, a grating structure similar to that shown in FIGS. 7, 8 was produced using a standard contact lithography process. A piece of 1.1 mm thick ITO coated glass was spin coated with the photo-resist Shipley 1805 at a speed of 3000 rpm for 30 seconds. This gave a film thickness of 0.55 μm. The surface was then soft baked at 90° C. for 30 minutes to remove excess solvent. A chrome mask, fabricated using the e-beam method (see FIG. 10) was then fixed in close contact with the photo-resist surface. The mask consisted of 0.5 μm chrome lines separated by 0.5 μm gaps, as shown in FIG. 10. The sample was exposed for 530 seconds using an unfiltered mercury lamp (0.3 mW/cm$^2$). The exposure was carried out an angle of 60° to the surface normal and with the component in the substrate plane at 450 to the both grating directions in the mask.

This process led to a defect state pretilt for each part of the grating grid of 450 (that is the zenithal bistable states were pretilts of 45° and 90°). Spin development was then done at 800 rpm for 10 seconds using Shipley MF 319, followed by a rinse in de-ionised water. This led to the formation of the grating grid surface with a pitch of 1.0 μm. The photo-resist was then hardened by exposure to deep UV (254 nm) followed by a 2 hour bake at 180° C. Finally, the surface was rendered homeotropic by treating with the homeotropic alignment polymer JALS 688, spun at 300 rpm and baked at 180° C. for 30 seconds. A 4 μm liquid crystal cell was then constructed by placing this zenithal bistable grid surface opposite a flat, homeotropic surface using the same JALS 688 process described above. This opposite surface was made by preparing a thinner layer (0.2 μm) of Shipley 1805 in a similar manner to the grating surface but without the grating exposure. A cell was formed from one grating surface and one flat surface using an edge seal glue containing 20 μm glass bead spacers. The cell was filled with the commercial nematic liquid crystal MLC 6602 (available from E. Merck, Germany) which has a positive dielectric anisotropy throughout the possible frequency and temperature operating ranges and a high Δn value to give the maximum diffractive effect. Filling was done by capillary action in the isotropic phase followed by slow cooling into the nematic phase.

Following construction as detailed above, electrical contact was made to the ITO of each substrate and alternating switching pulses applied, with a duty cycle of 100:1. This signal was composed of rectilinear pulses of typical duration 0.1 to 100 ms and magnitude in the range 20 to 100 V. Between 50 to 1 and 500 to 1 duty ratios were used, and an AC waveform of frequency 1 kHz to 100 kHz and magnitude Vrms (0V to 10V) superimposed. Other electrical signals, such as the multiplexing signal used in 9521106.6 could also be used. The resulting changes in the texture when viewed between crossed polarisers using a light microscope are shown in FIGS. 22, 23, and 24.

The cell was illuminated by a Helium Neon laser light source and the resulting diffraction pattern projected onto a screen. Bistable latching was obtained between diffracting and nor-diffracting states, the results for which are shown in FIGS. 25, 26, and 27. The cell was also illuminated with a tungsten white light source, and was observed to be weakly scattering in one state, and transmissive in the other, again with each state selected electrically using pulses of the appropriate polarity and suitable duration and magnitude.

EXAMPLE 2

A similar cell to that of example 2 was also produced but this time using zinc-sulphide substrates rather than the conventional glass. This cell was then tested for use in the IR by imaging a warm object using an IR camera sensitive to the wavelength range 3 to 5 μm. The contrast between scattering and non-scattering states was found to be significantly higher than that observed at optical wavelengths, so that an image, which was clearly discernible in the non-scattering state, was obscured by the cell after latching into the scattering state.

EXAMPLE 3

A third cell was prepared following the same procedure as in the previous example, but the cell was filled with the liquid crystal E7 into which 2% by weight of a black dichroic dye had been mixed (see for example Bahadur Liquid Crystals: Applications and Uses, Volume 3, Chapter 11, World Scientific Press). In this case, a contrast ratio of about 2:1 was observed between the two latched states for light of normal incidence, due to the difference in optical absorption between the two states. This was improved still further by operating the cell in reflective mode, in which the flat surface of one side of the cell was coated by a reflective aluminium layer.

EXAMPLE 4

In the previous example, the scattering was very weak, and unattractive for a display device. The reason for this was that the size of the variation of alignment direction within the substrate plane was on length scales significantly higher than the wavelength of incident light. To ensure a higher degree of scattering for optical wavelengths a substrate was prepared using a mask with a design similar to that of FIG. 6b), wherein the grating pitch was 0.15 μm and the features of constant groove direction had an average width of about 0.6 μm. The smaller feature sizes were achieved using a frequency doubled argon ion laser (at 257 nm, for example see Hutley ibid p99) used to develop the deep UV photo resist PMGI. In this example, the substrate was irradiated at normal incidence. After development, the surface was coated with a fluorinated chrome complex homeotropic surfactant and spaced at 20 μm from a second, flat homeotropic surface. The cell was again filled with BLO36, as in example 1, and used to switch between a transmissive state and a scattering state. The device was also found to give a moderate degree of backscatter. This was used in a polariser free display configuration, where the device was mounted in front of a black (or coloured) background. This gave a contrast ratio of about 4:1 for light of normal incidence which is adequate for some display applications, where the low power, bistability and mechanical durability are prime requirements.

Further improvements to the brightness of the back scattering state were achieved using a holographic reflector plate as described in U.S. Pat. No. 3,910,681. This collected incident light but partially back reflect output light, thereby providing multiple paths through scattering device.

EXAMPLE 5

The method of example 4 was also applied to form a surface of randomly spaced micro-pores, as shown in FIG. 9, in which each hole was approximately 0.2 µm deep and 0.35 µm in diameter. This gave improved scattering and non-scattering states over previous examples.

EXAMPLE 6

A glass substrate that had previously been coated with the conductor ITO and suitably etched, was spin coated with the photo-resist layer SU8 spun at 3000 rpm for 30 s. The sample was then soft baked at 100° C. for 10 minutes, followed by exposure for 3 minutes to UV light and baked at 160° C. for 30 minutes. This layer was used to form a barrier layer over the ITO electrode. This was then overcoated with the grating that was formed using the following process. The photo-resist Shipley 1813 was spun down at 3000 rpm for 30 s and then baked at 115° C. for 60 sec, forming a layer of thickness 1.55 µm. A mono-grating mask with a 1.2 µm pitch (such as that shown in FIG. 3) was pressed against this surface which was exposed using an intense UV source (a 1 kW OAI Mercury Xenon arc lamp producing 30 mW/cm$^2$ intensity) for 6 seconds. The mask was then re-oriented through 900 and again exposed for a period of 6 seconds.

The bigrating was then developed by spin coating Shipley MF 319 at 800 rpm for 10 seconds, followed by a rinse in doubly de-ionised water. The bigrating was then cured in hard UV and baked at 180° C. for 2 hours. The bigrating surface was then overcoated with the homeotropic alignment polymer JALS 688 (from Japan Synthetic Rubber Company) spun at 300 rpm and baked at 180° C. for 60 s. A 4.5 µm cell was constructed using this bigrating surface, and a flat substrate that had also been coated with JALS 688.

The cell was then filled with the liquid crystal material MLC 6204, from Merck, Germany. The cell was cooled initially from the isotropic phase, to form the defect state over the whole active area. The defects in this virgin state were of much greater size than those of either FIG. 29 or 35, and showed negligible scattering of laser light. The cell was then connected to an arbitrary waveform generator to supply an appropriate electrical signal. The signal used throughout the experiments was a single pulse of polarity +V and duration τ, immediately followed by a pulse of −V and duration τ, and then a period of 1000τ at 0 V followed by a second bipolar pulse, but this time with the opposite polarity (−V followed by +V).

Means were provided so the pulse train could be interrupted, with no signal applied leaving the cell in either of its zero field states. When a pulse train of 40V amplitude and slot duration of 3 ms was applied the cell was observed to latch between bright and dark states. The transmission was detected using a photodiode (and an eye-response filter), and the temporal variation monitored using a storage oscilloscope. The temporal response, shown in FIG. 30, clearly shows the difference between the two states observed; see also FIGS. 31, and 32. With example 6, there was a decay of the optical response in the bright (defect) state as the defects initially coalesced. This was thought to be because the grating was shallow.

EXAMPLE 7

A second bi-grating cell was made, following the same procedure as that used for example 6, but this time using the photo resist Shipley 1818 (which gave a photo-resist thickness of 2.18 µm) and exposing each of the orthogonal monogratings for a duration of 9 seconds. This process led to a deeper bigrating structure in an attempt to improve the bistability. Both the virgin state and the latched defect state of this sample had much smaller domains than those of example 6, and the continuous state was even darker between crossed polarisers. This meant that approximately double the transmission was measured in the defect state, and a contrast of 70:1 achieved. The variation of both bright state transmission and contrast with cell orientation were also lower than that of example 6. This was partly because there was no decay of the light state transmission immediately after the trailing pulse of the applied field (see FIG. 36). Example 7 also gave a much higher degree of laser scattering and preferred optical appearance when used as a device.

Alternative fabrication methods for random zenithal bistable surfaces are as follows:—

Zenithal bistable surfaces may also be made using techniques other than those commonly used to manufacture gratings. A novel method used in the present invention is through mixed alignments. A method is described in the patent of Harada et. al. EP 0 732 610 A2 in which two or more polymers of different solubility are mixed in a solvent and spin coated onto a suitable substrate to act as a give micro-droplets surface energy of substrate to control droplet size and shape. In the fifth example of that patent, the polymers PAS and poly 4 vinylbiphenyl were mixed in the ratio 10:1 in the solvent N-methyl pyrrolidone (NMP) to give s 3% concentration by weight. Spin coating and baking at 200° C. for 1 hour then led to 50 nm thick alignment layer with irregularly spaced surface protrusions of about 30 nm height, and 50 nm diameter. In the present invention, this surface was then coated with a low energy surfactant, such as a fluorinated chrome complex, or silane (e.g. ZLI 3334) homeotropic agent. The high density of very small scattering centres led to a highly scattering state, although the contrast was poor due to a relatively high degree of scatter in the other state due to some areas where the defect state remained monostable. This is a problem common to many of the non-grating methods, since it is often difficult to achieve the same degree of surface control. However, it was found that some improvement was possible using a surfactant added into the polymer solution to help control the micro droplet size. Other examples are also possible including using two immiscible homeotropic alignment polymers, using one polymer with different solubilities in two immiscible solvents etc.

Similar techniques may also be used to produce a microporous surface, in which the alignment layer is formed in the same fashion as PDLC (that is using photo, thermal or solvent induced phase separation (PIPS, TIPS or SIPS) methods reviewed, for example, by Doane, in Bahadur, "Liquid Crystals: Applications and Uses, Volume 1, World Scientific, 1990, p361). The monomer containing solvent (sometimes used in conjunction with a suitable photo initiator if the PIPS process is employed) is spun down to give a surface film with a precisely controlled thickness.

Surfaces of the type shown in both FIGS. 17, 18, 19 and 20 are possible through careful control of the solution concentrations, temperature, wetting properties of the underlying surface etc. Alternatively, a fine aerosol spray of monomer droplets may be used to coat a homeotropic surface, hardened (thermally and/or optically) and coated in a homeotropic surfactant if necessary. In this example the initial surfactant coating serves both as an alignment agent of the liquid crystal, and as a wetting agent which increases the contact angle of the droplets before curing, thereby ensuring well formed steep features of the correct shape to give zenithal bistability.

The invention claimed is:

1. A cell wall for a liquid crystal device, said cell wall having a surface relief grating formed as a bigrating having a surface modulation in two different surface directions,
    wherein the bigrating provides zenithal bistability to liquid crystal material in contact with the cell wall, and
    wherein the zenithal bistability provides to the liquid crystal material, at a first location of the cell wall, two stable states wherein the orientation of the liquid crystal material in both of said two stable states is within the same azimuthal plane but with different pretilt angles in each state.

2. A cell wall as claimed in claim 1 wherein said bigrating is formed from a low energy material.

3. A cell wall as claimed in claim 1 wherein said bigrating is coated with a low energy treatment.

4. A cell wall as claimed in claim 1 wherein said bigrating is formed from or coated with a material that causes local homeotropic alignment of liquid crystal material in contact with the cell wall.

5. A cell wall as claimed in claim 1 wherein said bigrating is formed from two gratings, each of which has a ratio of amplitude over pitch in the range of 0.1 to 2.

6. A liquid crystal device as claimed in claim 5 having first and second polarizers, the first polarizer being located on one side of the cell and the second polarizer being located on the other side of the cell and arranged in crossed configuration.

7. A cell wall as claimed in claim 1 wherein said bigrating is formed from two gratings, each of which has a pitch in the range of 0.2 µm to 2 µm.

8. A cell wall as claimed in claim 1 wherein said bigrating is formed from two gratings, each of which has a depth in the range of 0.3 µm to 2 µm.

9. A liquid crystal device comprising a layer of liquid crystal material disposed between a first cell wall and a second cell wall wherein the first cell wall is a cell wall as claimed in claim 1.

10. A liquid crystal device comprising a layer of nematic liquid crystal material disposed between two cell walls, at least one cell wall having an irregular arrangement of protrusions and/or holes to provide zenithal bistability to said liquid crystal material,
    wherein the zenithal bistability provides to the liquid crystal material, at a particular cell wall location, two stable states where the orientation of the liquid crystal material in both of the two stable states is within the same azimuthal plane but with different pretilt angles in each state.

11. A liquid crystal device as claimed in claim 10 wherein the arrangement of said protrusions or holes is pseudorandom.

12. A liquid crystal device having a layer of liquid crystal material disposed between two cell walls wherein at least part of the layer of liquid crystal material is zenithally bistable,
    wherein the device can be switched between two stable states that are optically distinct in the absence of any polarizers, and
    wherein the zenithal bistability provides to the liquid crystal material, at a particular cell wall location, two stable states where the orientation of the liquid crystal material in both of the two stable states is within the same azimuthal plane but with different pretilt angles in each state.

13. A liquid crystal device as claimed in claim 12 wherein one cell wall comprises an absorber.

14. A liquid crystal device as claimed in claim 12 wherein one cell wall comprises a reflector.

15. A liquid crystal device as claimed in claim 12 wherein one cell wall comprises a color layer.

16. A liquid crystal device as claimed in claim 12 wherein one cell wall comprises a micro-prism layer.

* * * * *